(12) United States Patent
Wasser et al.

(10) Patent No.: US 9,400,589 B1
(45) Date of Patent: *Jul. 26, 2016

(54) CIRCULAR ROTATIONAL INTERFACE FOR DISPLAY OF CONSUMER CREDIT INFORMATION

(71) Applicant: CONSUMERINFO.COM, INC., Costa Mesa, CA (US)

(72) Inventors: Jeremy Wasser, Los Angeles, CA (US); Michelle Felice-Steele, Los Angeles, CA (US); Melinda Nies, Arvada, CO (US); Luke Giltner, Denver, CO (US)

(73) Assignee: CONSUMERINFO.COM, INC., Costa Mesa, CA (US)

( * ) Notice: Subject to any disclaimer, the term of this patent is extended or adjusted under 35 U.S.C. 154(b) by 469 days.

This patent is subject to a terminal disclaimer.

(21) Appl. No.: 13/797,278

(22) Filed: Mar. 12, 2013

Related U.S. Application Data

(60) Provisional application No. 61/732,244, filed on Nov. 30, 2012.

(51) Int. Cl.
*G06F 3/00* (2006.01)
*G06F 3/0482* (2013.01)
*G06F 3/01* (2006.01)

(52) U.S. Cl.
CPC .................................. *G06F 3/0482* (2013.01)

(58) Field of Classification Search
None
See application file for complete search history.

(56) References Cited

U.S. PATENT DOCUMENTS

| | | |
|---|---|---|
| 3,316,395 A | 4/1967 | Lavin et al. |
| 3,405,457 A | 10/1968 | Bitzer |
| 4,346,442 A | 8/1982 | Musmanno |
| 4,734,858 A | 3/1988 | Schlafly |
| 4,736,294 A | 4/1988 | Gill |
| 4,755,940 A | 7/1988 | Brachtl et al. |
| 4,774,664 A | 9/1988 | Campbell et al. |
| 4,812,628 A | 3/1989 | Boston et al. |
| 4,876,592 A | 10/1989 | Von Kohorn |
| 4,891,503 A | 1/1990 | Jewell |
| 4,895,518 A | 1/1990 | Arnold |

(Continued)

FOREIGN PATENT DOCUMENTS

| | | |
|---|---|---|
| EP | 0 542 298 | 5/1993 |
| EP | 0 869 652 | 10/1998 |

(Continued)

OTHER PUBLICATIONS

U.S. Appl. No. 12/705,489, filed Feb. 12, 2010, Bargoli et al.

(Continued)

*Primary Examiner* — Toan Vu
(74) *Attorney, Agent, or Firm* — Knobbe Martens Olson & Bear LLP

(57) ABSTRACT

A credit score user interface that may comprise a circular visual interface to view a consumer's credit information is disclosed herein. Sections of the circular visual interface may correspond to credit categories, where each section is sized according to the impact of the associated credit category on the consumer's credit score. One of the category sections may be selected, and credit information about a specific consumer that is related to that section may be displayed. The selected credit category may change based on touch input. A change in selection may cause new credit information related to the newly selected credit category to be displayed about the specific consumer.

16 Claims, 10 Drawing Sheets

(56) References Cited

U.S. PATENT DOCUMENTS

| | | |
|---|---|---|
| 4,947,028 A | 8/1990 | Gorog |
| 4,977,595 A | 12/1990 | Ohta et al. |
| 4,989,141 A | 1/1991 | Lyons et al. |
| 5,034,807 A | 7/1991 | Von Kohorn |
| 5,148,365 A | 9/1992 | Dembo |
| 5,201,010 A | 4/1993 | Deaton et al. |
| 5,220,501 A | 6/1993 | Lawlor et al. |
| 5,259,766 A | 11/1993 | Sack |
| 5,262,941 A | 11/1993 | Saladin |
| 5,274,547 A | 12/1993 | Zoffel et al. |
| 5,336,870 A | 8/1994 | Hughes et al. |
| 5,383,113 A | 1/1995 | Kight et al. |
| 5,404,518 A | 4/1995 | Gilbertson et al. |
| 5,500,513 A | 3/1996 | Langhans et al. |
| 5,590,038 A | 12/1996 | Pitroda |
| 5,592,560 A | 1/1997 | Deaton et al. |
| 5,611,052 A | 3/1997 | Dykstra et al. |
| 5,615,408 A | 3/1997 | Johnson |
| 5,640,577 A | 6/1997 | Scharmer |
| 5,659,725 A | 8/1997 | Levy et al. |
| 5,659,731 A | 8/1997 | Gustafson |
| 5,704,029 A | 12/1997 | Wright, Jr. |
| 5,719,941 A | 2/1998 | Swift et al. |
| 5,732,400 A | 3/1998 | Mandler |
| 5,739,512 A | 4/1998 | Tognazzini |
| 5,754,632 A | 5/1998 | Smith |
| 5,774,883 A | 6/1998 | Andersen |
| 5,793,972 A | 8/1998 | Shane |
| 5,819,234 A | 10/1998 | Slavin et al. |
| 5,832,068 A | 11/1998 | Smith |
| 5,842,211 A | 11/1998 | Horadan et al. |
| 5,844,218 A | 12/1998 | Kawan et al. |
| 5,875,236 A | 2/1999 | Jankowitz |
| 5,878,403 A | 3/1999 | DeFrancesco |
| 5,881,131 A | 3/1999 | Farris et al. |
| 5,884,287 A | 3/1999 | Edesess |
| 5,884,302 A | 3/1999 | Ho |
| 5,903,830 A | 5/1999 | Joao et al. |
| 5,903,881 A | 5/1999 | Schrader et al. |
| 5,930,764 A | 7/1999 | Melchione et al. |
| 5,930,776 A | 7/1999 | Dykstra et al. |
| 5,940,812 A | 8/1999 | Tengel et al. |
| 5,950,172 A | 9/1999 | Klingman |
| 5,956,693 A | 9/1999 | Geerlings |
| 5,963,939 A | 10/1999 | McCann et al. |
| 5,966,695 A | 10/1999 | Melchione et al. |
| 5,978,780 A | 11/1999 | Watson |
| 5,995,947 A | 11/1999 | Fraser et al. |
| 5,999,596 A | 12/1999 | Walker et al. |
| 6,006,333 A | 12/1999 | Nielsen |
| 6,009,415 A | 12/1999 | Shurling et al. |
| 6,021,397 A | 2/2000 | Jones et al. |
| 6,021,943 A | 2/2000 | Chastain |
| 6,026,440 A | 2/2000 | Shrader et al. |
| 6,029,149 A | 2/2000 | Dykstra et al. |
| 6,038,551 A | 3/2000 | Barlow et al. |
| 6,064,987 A | 5/2000 | Walker |
| 6,064,990 A | 5/2000 | Goldsmith |
| 6,070,141 A | 5/2000 | Houvener |
| 6,072,894 A | 6/2000 | Payne |
| 6,073,140 A | 6/2000 | Morgan et al. |
| 6,085,242 A | 7/2000 | Chandra |
| 6,088,686 A | 7/2000 | Walker et al. |
| 6,094,643 A | 7/2000 | Anderson et al. |
| 6,105,007 A | 8/2000 | Norris |
| 6,115,690 A | 9/2000 | Wong |
| 6,119,103 A | 9/2000 | Basch et al. |
| 6,128,599 A | 10/2000 | Walker |
| 6,128,602 A | 10/2000 | Northington et al. |
| 6,128,603 A | 10/2000 | Dent |
| 6,149,441 A | 11/2000 | Pellegrino et al. |
| 6,157,707 A | 12/2000 | Baulier et al. |
| 6,161,139 A | 12/2000 | Win et al. |
| 6,178,420 B1 | 1/2001 | Sassano |
| 6,182,068 B1 | 1/2001 | Culliss |
| 6,182,229 B1 | 1/2001 | Nielsen |
| 6,185,543 B1 | 2/2001 | Galperin et al. |
| 6,202,053 B1 | 3/2001 | Christiansen et al. |
| 6,208,979 B1 | 3/2001 | Sinclair |
| 6,233,566 B1 | 5/2001 | Levine et al. |
| 6,236,977 B1 | 5/2001 | Verba et al. |
| 6,249,770 B1 | 6/2001 | Erwin et al. |
| 6,254,000 B1 | 7/2001 | Degen et al. |
| 6,263,447 B1 | 7/2001 | French et al. |
| 6,282,658 B2 | 8/2001 | French et al. |
| 6,304,860 B1 | 10/2001 | Martin et al. |
| 6,311,169 B2 | 10/2001 | Duhon |
| 6,321,339 B1 | 11/2001 | French et al. |
| 6,324,524 B1 | 11/2001 | Lent et al. |
| 6,327,578 B1 | 12/2001 | Linehan |
| 6,330,575 B1 | 12/2001 | Moore |
| 6,343,279 B1 | 1/2002 | Bissonette et al. |
| 6,353,778 B1 | 3/2002 | Brown |
| 6,356,937 B1 | 3/2002 | Montville et al. |
| 6,384,844 B1 | 5/2002 | Stewart et al. |
| 6,386,444 B1 | 5/2002 | Sullivan |
| 6,397,197 B1 | 5/2002 | Gindlesperger |
| 6,397,212 B1 | 5/2002 | Biffar |
| 6,405,173 B1 | 6/2002 | Honarvar |
| 6,405,181 B2 | 6/2002 | Lent et al. |
| 6,421,675 B1 | 7/2002 | Ryan et al. |
| 6,422,462 B1 | 7/2002 | Cohen |
| 6,453,353 B1 | 9/2002 | Win et al. |
| 6,457,012 B1 | 9/2002 | Jatkowski |
| 6,496,936 B1 | 12/2002 | French et al. |
| 6,513,018 B1 | 1/2003 | Culhane |
| 6,523,021 B1 | 2/2003 | Monberg et al. |
| 6,523,041 B1 | 2/2003 | Morgan et al. |
| 6,539,377 B1 | 3/2003 | Culliss |
| 6,539,392 B1 | 3/2003 | Rebane |
| 6,543,683 B2 | 4/2003 | Hoffman |
| 6,564,210 B1 | 5/2003 | Korda et al. |
| 6,567,791 B2 | 5/2003 | Lent et al. |
| 6,571,236 B1 | 5/2003 | Ruppelt |
| 6,574,736 B1 | 6/2003 | Andrews |
| 6,581,025 B2 | 6/2003 | Lehman |
| 6,611,816 B2 | 8/2003 | Lebda et al. |
| 6,615,193 B1 | 9/2003 | Kingdon et al. |
| 6,622,131 B1 | 9/2003 | Brown et al. |
| 6,629,245 B1 | 9/2003 | Stone et al. |
| 6,647,383 B1 | 11/2003 | August et al. |
| 6,658,393 B1 | 12/2003 | Basch et al. |
| 6,665,715 B1 | 12/2003 | Houri |
| 6,678,694 B1 | 1/2004 | Zimmermann et al. |
| 6,703,930 B2 | 3/2004 | Skinner |
| 6,714,944 B1 | 3/2004 | Shapiro et al. |
| 6,725,381 B1 | 4/2004 | Smith et al. |
| 6,745,938 B2 | 6/2004 | Sullivan |
| 6,750,985 B2 | 6/2004 | Rhoads |
| 6,766,327 B2 | 7/2004 | Morgan, Jr. et al. |
| 6,781,608 B1 | 8/2004 | Crawford |
| 6,782,379 B2 | 8/2004 | Lee |
| 6,792,088 B2 | 9/2004 | Takeuchi |
| 6,792,263 B1 | 9/2004 | Kite |
| 6,796,497 B2 | 9/2004 | Benkert et al. |
| 6,804,346 B1 | 10/2004 | Mewhinney |
| 6,805,287 B2 | 10/2004 | Bishop et al. |
| 6,816,850 B2 | 11/2004 | Culliss |
| 6,845,448 B1 | 1/2005 | Chaganti et al. |
| 6,857,073 B2 | 2/2005 | French et al. |
| 6,871,287 B1 | 3/2005 | Ellingson |
| 6,892,307 B1 | 5/2005 | Wood et al. |
| 6,900,731 B2 | 5/2005 | Kreiner et al. |
| 6,901,406 B2 | 5/2005 | Nabe et al. |
| 6,910,624 B1 | 6/2005 | Natsuno |
| 6,928,487 B2 | 8/2005 | Eggebraaten et al. |
| 6,934,714 B2 | 8/2005 | Meinig |
| 6,941,323 B1 | 9/2005 | Galperin |
| 6,947,989 B2 | 9/2005 | Gullotta et al. |
| 6,950,807 B2 | 9/2005 | Brock |
| 6,959,281 B1 | 10/2005 | Freeling et al. |
| 6,962,336 B2 | 11/2005 | Glass |
| 6,965,881 B1 | 11/2005 | Brickell et al. |
| 6,968,319 B1 | 11/2005 | Remington et al. |

(56) References Cited

U.S. PATENT DOCUMENTS

| | | |
|---|---|---|
| 6,973,462 B2 | 12/2005 | Dattero et al. |
| 6,985,887 B1 | 1/2006 | Sunstein et al. |
| 6,988,085 B2 | 1/2006 | Hedy |
| 6,999,941 B1 | 2/2006 | Agarwal |
| 7,016,907 B2 | 3/2006 | Boreham et al. |
| 7,028,013 B2 | 4/2006 | Saeki |
| 7,028,052 B2 | 4/2006 | Chapman et al. |
| 7,039,607 B2 | 5/2006 | Watarai et al. |
| 7,043,476 B2 | 5/2006 | Robson |
| 7,046,139 B2 | 5/2006 | Kuhn et al. |
| 7,058,386 B2 | 6/2006 | McGregor et al. |
| 7,058,817 B1 | 6/2006 | Ellmore |
| 7,062,475 B1 | 6/2006 | Szabo et al. |
| 7,069,240 B2 | 6/2006 | Spero et al. |
| 7,072,909 B2 | 7/2006 | Polk |
| 7,076,462 B1 | 7/2006 | Nelson et al. |
| 7,076,475 B2 | 7/2006 | Honarvar |
| 7,085,727 B2 | 8/2006 | VanOrman |
| 7,089,594 B2 | 8/2006 | Lal et al. |
| 7,107,241 B1 | 9/2006 | Pinto |
| 7,124,144 B2 | 10/2006 | Christianson et al. |
| 7,133,935 B2 | 11/2006 | Hedy |
| 7,143,063 B2 | 11/2006 | Lent |
| 7,155,739 B2 | 12/2006 | Bari et al. |
| 7,181,418 B1 | 2/2007 | Zucker et al. |
| 7,181,427 B1 | 2/2007 | DeFrancesco |
| 7,194,416 B1 | 3/2007 | Provost et al. |
| 7,200,602 B2 | 4/2007 | Jonas |
| 7,209,895 B2 | 4/2007 | Kundtz et al. |
| 7,218,912 B2 | 5/2007 | Erskine et al. |
| 7,219,107 B2 | 5/2007 | Beringer |
| 7,222,369 B2 | 5/2007 | Vering et al. |
| 7,234,156 B2 | 6/2007 | French et al. |
| 7,236,950 B2 | 6/2007 | Savage et al. |
| 7,243,369 B2 | 7/2007 | Bhat et al. |
| 7,246,740 B2 | 7/2007 | Swift et al. |
| 7,249,076 B1 | 7/2007 | Pendleton et al. |
| 7,249,113 B1 | 7/2007 | Continelli et al. |
| 7,263,497 B1 | 8/2007 | Wiser et al. |
| 7,275,083 B1 | 9/2007 | Seibel et al. |
| 7,280,980 B1 | 10/2007 | Hoadley et al. |
| 7,281,652 B2 | 10/2007 | Foss |
| 7,289,971 B1 | 10/2007 | O'Neil et al. |
| 7,296,734 B2 | 11/2007 | Pliha |
| 7,302,272 B2 | 11/2007 | Ackley |
| 7,310,611 B2 | 12/2007 | Shibuya et al. |
| 7,310,617 B1 | 12/2007 | Cunningham |
| 7,314,167 B1 | 1/2008 | Kiliccote |
| 7,315,837 B2 | 1/2008 | Sloan et al. |
| 7,328,233 B2 | 2/2008 | Salim et al. |
| 7,330,717 B2 | 2/2008 | Gidron et al. |
| 7,330,835 B2 | 2/2008 | Deggendorf |
| 7,333,635 B2 | 2/2008 | Tsantes et al. |
| 7,337,133 B1 | 2/2008 | Bezos et al. |
| 7,337,468 B2 | 2/2008 | Metzger |
| 7,340,679 B2 | 3/2008 | Botscheck et al. |
| 7,343,149 B2 | 3/2008 | Benco |
| 7,343,295 B2 | 3/2008 | Pomerance |
| 7,356,516 B2 | 4/2008 | Richey et al. |
| 7,366,694 B2 | 4/2008 | Lazerson |
| 7,370,044 B2 | 5/2008 | Mulhern et al. |
| 7,373,324 B1 | 5/2008 | Engin et al. |
| 7,383,988 B2 | 6/2008 | Slonecker, Jr. |
| 7,386,511 B2 | 6/2008 | Buchanan et al. |
| 7,389,913 B2 | 6/2008 | Starrs |
| 7,395,273 B2 | 7/2008 | Khan et al. |
| 7,403,942 B1 | 7/2008 | Bayliss |
| 7,409,369 B1 | 8/2008 | Homuth et al. |
| 7,412,228 B2 | 8/2008 | Barclay et al. |
| 7,433,864 B2 | 10/2008 | Malik |
| 7,437,679 B2 | 10/2008 | Uemura et al. |
| 7,444,518 B1 | 10/2008 | Dharmarajan et al. |
| 7,451,095 B1 | 11/2008 | Bradley et al. |
| 7,451,113 B1 | 11/2008 | Kasower |
| 7,458,508 B1 | 12/2008 | Shao et al. |
| 7,467,401 B2 | 12/2008 | Cicchitto |
| 7,472,088 B2 | 12/2008 | Taylor et al. |
| 7,475,032 B1 | 1/2009 | Patnode et al. |
| 7,479,949 B2 | 1/2009 | Jobs et al. |
| 7,480,631 B1 | 1/2009 | Merced et al. |
| 7,503,489 B2 | 3/2009 | Heffez |
| 7,505,939 B2 | 3/2009 | Lent et al. |
| 7,509,117 B2 | 3/2009 | Yum |
| 7,512,221 B2 | 3/2009 | Toms |
| 7,529,698 B2 | 5/2009 | Joao |
| 7,530,097 B2 | 5/2009 | Casco-Arias et al. |
| 7,536,329 B2 | 5/2009 | Goldberg et al. |
| 7,536,348 B2 | 5/2009 | Shao et al. |
| 7,542,993 B2 | 6/2009 | Satterfield et al. |
| 7,543,739 B2 | 6/2009 | Brown et al. |
| 7,546,271 B1 | 6/2009 | Chmielewski et al. |
| 7,548,886 B2 | 6/2009 | Kirkland et al. |
| 7,552,086 B1 | 6/2009 | Rajasekar et al. |
| 7,552,089 B2 | 6/2009 | Bruer et al. |
| 7,552,467 B2 | 6/2009 | Lindsay |
| 7,559,217 B2 | 7/2009 | Bass |
| 7,562,184 B2 | 7/2009 | Henmi et al. |
| 7,562,814 B1 | 7/2009 | Shao et al. |
| 7,571,138 B2 | 8/2009 | Miri et al. |
| 7,571,139 B1 | 8/2009 | Giordano et al. |
| 7,571,473 B1 | 8/2009 | Boydstun et al. |
| 7,575,157 B2 | 8/2009 | Barnhardt et al. |
| 7,577,665 B2 | 8/2009 | Ramer et al. |
| 7,577,934 B2 | 8/2009 | Anonsen et al. |
| 7,580,856 B1 | 8/2009 | Pliha |
| 7,580,884 B2 | 8/2009 | Cook |
| 7,581,112 B2 | 8/2009 | Brown et al. |
| 7,584,146 B1 | 9/2009 | Duhon |
| 7,587,368 B2 | 9/2009 | Felsher |
| 7,590,589 B2 | 9/2009 | Hoffberg |
| 7,593,889 B2 | 9/2009 | Raines et al. |
| 7,593,891 B2 | 9/2009 | Kornegay et al. |
| 7,594,019 B2 | 9/2009 | Clapper |
| 7,610,216 B1 | 10/2009 | May et al. |
| 7,610,229 B1 | 10/2009 | Kornegay |
| 7,610,257 B1 | 10/2009 | Abrahams |
| 7,613,600 B2 | 11/2009 | Krane |
| 7,620,596 B2 | 11/2009 | Knudson et al. |
| 7,623,844 B2 | 11/2009 | Herrmann et al. |
| 7,634,737 B2 | 12/2009 | Beringer et al. |
| 7,640,200 B2 | 12/2009 | Gardner et al. |
| 7,647,274 B2 | 1/2010 | Peterson et al. |
| 7,647,344 B2 | 1/2010 | Skurtovich, Jr. et al. |
| 7,653,592 B1 | 1/2010 | Flaxman et al. |
| 7,653,600 B2 | 1/2010 | Gustin |
| 7,653,688 B2 | 1/2010 | Bittner |
| 7,672,833 B2 | 3/2010 | Blume et al. |
| 7,685,209 B1 | 3/2010 | Norton et al. |
| 7,686,214 B1 | 3/2010 | Shao et al. |
| 7,688,813 B2 | 3/2010 | Shin et al. |
| 7,689,487 B1 | 3/2010 | Britto et al. |
| 7,689,505 B2 | 3/2010 | Kasower |
| 7,689,563 B1 | 3/2010 | Jacobson |
| 7,690,032 B1 | 3/2010 | Peirce |
| 7,693,787 B2 | 4/2010 | Provinse |
| 7,698,214 B1 | 4/2010 | Lindgren |
| 7,698,217 B1 | 4/2010 | Phillips et al. |
| 7,707,122 B2 | 4/2010 | Hull et al. |
| 7,707,271 B2 | 4/2010 | Rudkin et al. |
| 7,708,190 B2 | 5/2010 | Brandt et al. |
| 7,711,635 B2 | 5/2010 | Steele et al. |
| 7,711,636 B2 | 5/2010 | Robida et al. |
| 7,715,832 B2 | 5/2010 | Zhou |
| 7,725,385 B2 | 5/2010 | Royer et al. |
| 7,729,959 B1 | 6/2010 | Wells et al. |
| 7,730,078 B2 | 6/2010 | Schwabe et al. |
| 7,739,707 B2 | 6/2010 | Sie et al. |
| 7,747,520 B2 | 6/2010 | Livermore et al. |
| 7,747,521 B2 | 6/2010 | Serio |
| 7,747,559 B2 | 6/2010 | Leitner et al. |
| 7,756,789 B2 | 7/2010 | Welker et al. |
| 7,761,384 B2 | 7/2010 | Madhogarhia |
| 7,765,148 B2 | 7/2010 | German et al. |
| 7,765,166 B2 | 7/2010 | Beringer et al. |

(56) References Cited

U.S. PATENT DOCUMENTS

| | | |
|---|---|---|
| 7,769,697 B2 | 8/2010 | Fieschi et al. |
| 7,774,257 B2 | 8/2010 | Maggioncalda et al. |
| 7,774,270 B1 | 8/2010 | MacCloskey |
| 7,783,515 B1 | 8/2010 | Kumar et al. |
| 7,787,869 B2 | 8/2010 | Rice et al. |
| 7,788,040 B2 | 8/2010 | Haskell et al. |
| 7,788,147 B2 | 8/2010 | Haggerty et al. |
| 7,792,715 B1 | 9/2010 | Kasower |
| 7,792,903 B2 | 9/2010 | Fischer et al. |
| 7,793,835 B1 | 9/2010 | Coggeshall et al. |
| 7,797,252 B2 | 9/2010 | Rosskamm et al. |
| 7,801,807 B2 | 9/2010 | DeFrancesco et al. |
| 7,801,811 B1 | 9/2010 | Merrell et al. |
| 7,801,956 B1 | 9/2010 | Cumberbatch et al. |
| 7,802,104 B2 | 9/2010 | Dickinson |
| 7,805,362 B1 | 9/2010 | Merrell et al. |
| 7,809,398 B2 | 10/2010 | Pearson |
| 7,809,797 B2 | 10/2010 | Cooley et al. |
| 7,810,036 B2 | 10/2010 | Bales et al. |
| 7,814,004 B2 | 10/2010 | Haggerty et al. |
| 7,814,005 B2 | 10/2010 | Imrey et al. |
| 7,818,228 B1 | 10/2010 | Coulter |
| 7,818,229 B2 | 10/2010 | Imrey et al. |
| 7,827,115 B2 | 11/2010 | Weller et al. |
| 7,832,006 B2 | 11/2010 | Chen et al. |
| 7,840,484 B2 | 11/2010 | Haggerty et al. |
| 7,841,004 B1 | 11/2010 | Balducci et al. |
| 7,841,008 B1 | 11/2010 | Cole et al. |
| 7,844,520 B1 | 11/2010 | Franklin |
| 7,844,604 B2 | 11/2010 | Baio et al. |
| 7,848,972 B1 | 12/2010 | Sharma |
| 7,848,978 B2 | 12/2010 | Imrey et al. |
| 7,849,014 B2 | 12/2010 | Erikson |
| 7,853,493 B2 | 12/2010 | DeBie et al. |
| 7,856,203 B2 | 12/2010 | Lipovski |
| 7,856,386 B2 | 12/2010 | Hazlehurst et al. |
| 7,870,078 B2 | 1/2011 | Clark et al. |
| 7,877,304 B1 | 1/2011 | Coulter |
| 7,877,784 B2 | 1/2011 | Chow et al. |
| 7,890,420 B2 | 2/2011 | Haggerty et al. |
| 7,899,750 B1 | 3/2011 | Klieman et al. |
| 7,904,306 B2 | 3/2011 | Johnson et al. |
| 7,908,242 B1 | 3/2011 | Achanta |
| 7,909,246 B2 | 3/2011 | Hogg et al. |
| 7,912,865 B2 | 3/2011 | Akerman et al. |
| 7,925,582 B1 | 4/2011 | Kornegay et al. |
| 7,941,365 B1 | 5/2011 | Bradley et al. |
| 7,945,510 B1 | 5/2011 | Bradley et al. |
| 7,954,698 B1 | 6/2011 | Pliha |
| 7,958,046 B2 | 6/2011 | Doerner et al. |
| 7,962,404 B1 | 6/2011 | Metzger, II et al. |
| 7,966,192 B2 | 6/2011 | Pagliari et al. |
| 7,970,676 B2 | 6/2011 | Feinstein |
| 7,970,679 B2 | 6/2011 | Kasower |
| 7,975,299 B1 | 7/2011 | Balducci et al. |
| 7,979,908 B2 | 7/2011 | Millwee |
| 7,983,932 B2 | 7/2011 | Kane |
| 7,991,689 B1 | 8/2011 | Brunzell et al. |
| 8,001,042 B1 | 8/2011 | Brunzell et al. |
| 8,001,153 B2 | 8/2011 | Skurtovich, Jr. et al. |
| 8,001,235 B2 | 8/2011 | Russ et al. |
| 8,015,107 B2 | 9/2011 | Kornegay et al. |
| 8,032,932 B2 | 10/2011 | Speyer et al. |
| 8,036,979 B1 | 10/2011 | Torrez et al. |
| 8,037,097 B2 | 10/2011 | Guo et al. |
| 8,055,904 B1 | 11/2011 | Cato et al. |
| 8,060,424 B2 | 11/2011 | Kasower |
| 8,060,916 B2 | 11/2011 | Bajaj et al. |
| 8,065,233 B2 | 11/2011 | Lee et al. |
| 8,073,768 B2 | 12/2011 | Haggerty et al. |
| 8,078,453 B2 | 12/2011 | Shaw |
| 8,078,524 B2 | 12/2011 | Crawford et al. |
| 8,078,527 B2 | 12/2011 | Cerise et al. |
| 8,078,528 B1 | 12/2011 | Vicente et al. |
| 8,078,881 B1 | 12/2011 | Liu |
| 8,086,523 B1 | 12/2011 | Palmer |
| 8,095,443 B2 | 1/2012 | DeBie |
| 8,095,458 B2 | 1/2012 | Peterson et al. |
| 8,099,309 B1 | 1/2012 | Bober |
| 8,099,341 B2 | 1/2012 | Varghese |
| 8,104,679 B2 | 1/2012 | Brown |
| 8,127,982 B1 | 3/2012 | Casey et al. |
| 8,127,986 B1 | 3/2012 | Taylor et al. |
| 8,131,685 B1 | 3/2012 | Gedalius et al. |
| 8,131,777 B2 | 3/2012 | McCullouch |
| 8,160,960 B1 | 4/2012 | Fei et al. |
| 8,175,889 B1 | 5/2012 | Girulat et al. |
| 8,195,549 B2 | 6/2012 | Kasower |
| 8,201,257 B1 | 6/2012 | Andres et al. |
| 8,204,812 B2 | 6/2012 | Stewart et al. |
| 8,224,723 B2 | 7/2012 | Bosch et al. |
| 8,234,498 B2 | 7/2012 | Britti et al. |
| 8,244,848 B1 | 8/2012 | Narayanan et al. |
| 8,271,393 B2 | 9/2012 | Twining et al. |
| 8,281,372 B1 | 10/2012 | Vidal |
| 8,285,613 B1 | 10/2012 | Coulter |
| 8,285,656 B1 | 10/2012 | Chang et al. |
| 8,290,840 B2 | 10/2012 | Kasower |
| 8,290,856 B1 | 10/2012 | Kasower |
| 8,296,229 B1 | 10/2012 | Yellin et al. |
| 8,312,033 B1 | 11/2012 | McMillan |
| 8,315,943 B2 | 11/2012 | Torrez et al. |
| 8,321,334 B1 | 11/2012 | Kornegay et al. |
| 8,321,339 B2 | 11/2012 | Imrey et al. |
| 8,327,429 B2 | 12/2012 | Speyer et al. |
| 8,335,741 B2 | 12/2012 | Kornegay et al. |
| 8,355,967 B2 | 1/2013 | Debie et al. |
| 8,364,588 B2 | 1/2013 | Celka et al. |
| 8,374,973 B2 | 2/2013 | Herbrich et al. |
| 8,412,593 B1 | 4/2013 | Song et al. |
| 8,456,293 B1 | 6/2013 | Trundle et al. |
| 8,464,939 B1 | 6/2013 | Taylor et al. |
| 8,478,674 B1 | 7/2013 | Kapczynski et al. |
| 8,484,186 B1 | 7/2013 | Kapczynski et al. |
| 8,515,828 B1 | 8/2013 | Wolf et al. |
| 8,515,844 B2 | 8/2013 | Kasower |
| 8,527,357 B1 | 9/2013 | Ganesan |
| 8,533,118 B2 | 9/2013 | Weller et al. |
| 8,560,436 B2 | 10/2013 | Ingram et al. |
| 8,572,083 B1 | 10/2013 | Snell et al. |
| 8,578,496 B1 | 11/2013 | Krishnappa |
| 8,600,886 B2 | 12/2013 | Ramavarjula et al. |
| 8,601,602 B1 | 12/2013 | Zheng |
| 8,606,694 B2 | 12/2013 | Campbell et al. |
| 8,630,938 B2 | 1/2014 | Cheng et al. |
| 8,646,051 B2 | 2/2014 | Paden et al. |
| 8,705,718 B2 | 4/2014 | Baniak et al. |
| 8,725,613 B1 | 5/2014 | Celka et al. |
| 8,738,516 B1 | 5/2014 | Dean et al. |
| 8,768,914 B2 | 7/2014 | Scriffignano et al. |
| 8,781,953 B2 | 7/2014 | Kasower |
| 8,782,217 B1 | 7/2014 | Arone et al. |
| 8,818,888 B1 | 8/2014 | Kapczynski et al. |
| 8,856,894 B1 | 10/2014 | Dean et al. |
| 8,930,251 B2 | 1/2015 | DeBie |
| 8,930,263 B1 | 1/2015 | Mahacek et al. |
| 8,954,459 B1 | 2/2015 | McMillan et al. |
| 8,972,400 B1 | 3/2015 | Kapczynski et al. |
| 9,058,627 B1 | 6/2015 | Wasser et al. |
| 9,106,691 B1 | 8/2015 | Burger et al. |
| 2001/0029470 A1 | 10/2001 | Schultz et al. |
| 2001/0029482 A1 | 10/2001 | Tealdi et al. |
| 2001/0037289 A1 | 11/2001 | Mayr et al. |
| 2001/0039523 A1 | 11/2001 | Iwamoto |
| 2001/0039532 A1 | 11/2001 | Coleman, Jr. et al. |
| 2001/0039563 A1 | 11/2001 | Tian |
| 2001/0042785 A1 | 11/2001 | Walker et al. |
| 2001/0044729 A1 | 11/2001 | Pomerance |
| 2001/0044756 A1 | 11/2001 | Watkins et al. |
| 2001/0049274 A1 | 12/2001 | Degraeve |
| 2001/0049672 A1 | 12/2001 | Moore et al. |
| 2002/0010616 A1 | 1/2002 | Itzaki |
| 2002/0013827 A1 | 1/2002 | Edstrom et al. |
| 2002/0013899 A1 | 1/2002 | Faul |

(56) References Cited

U.S. PATENT DOCUMENTS

| | | |
|---|---|---|
| 2002/0023051 A1 | 2/2002 | Kunzle et al. |
| 2002/0032635 A1 | 3/2002 | Harris et al. |
| 2002/0032645 A1 | 3/2002 | Nozaki et al. |
| 2002/0032647 A1 | 3/2002 | Delinsky et al. |
| 2002/0033846 A1 | 3/2002 | Balasubramanian et al. |
| 2002/0035511 A1 | 3/2002 | Haji et al. |
| 2002/0045154 A1 | 4/2002 | Wood et al. |
| 2002/0052841 A1 | 5/2002 | Guthrie et al. |
| 2002/0055906 A1 | 5/2002 | Katz et al. |
| 2002/0059139 A1 | 5/2002 | Evans |
| 2002/0059201 A1 | 5/2002 | Work |
| 2002/0069122 A1 | 6/2002 | Yun et al. |
| 2002/0077964 A1 | 6/2002 | Brody et al. |
| 2002/0087460 A1 | 7/2002 | Hornung |
| 2002/0099635 A1 | 7/2002 | Guiragosian |
| 2002/0103933 A1 | 8/2002 | Garon et al. |
| 2002/0111816 A1 | 8/2002 | Lortscher et al. |
| 2002/0111890 A1 | 8/2002 | Sloan et al. |
| 2002/0120757 A1 | 8/2002 | Sutherland et al. |
| 2002/0128960 A1 | 9/2002 | Lambiotte et al. |
| 2002/0128962 A1 | 9/2002 | Kasower |
| 2002/0133365 A1 | 9/2002 | Grey et al. |
| 2002/0133462 A1 | 9/2002 | Shteyn |
| 2002/0138409 A1 | 9/2002 | Bass |
| 2002/0138470 A1 | 9/2002 | Zhou |
| 2002/0143943 A1 | 10/2002 | Lee et al. |
| 2002/0147801 A1 | 10/2002 | Gullotta et al. |
| 2002/0152166 A1 | 10/2002 | Dutta et al. |
| 2002/0156676 A1 | 10/2002 | Ahrens et al. |
| 2002/0161664 A1 | 10/2002 | Shaya et al. |
| 2002/0165757 A1 | 11/2002 | Lisser |
| 2002/0169747 A1 | 11/2002 | Chapman et al. |
| 2002/0173994 A1 | 11/2002 | Ferguson, III |
| 2002/0194120 A1 | 12/2002 | Russell et al. |
| 2002/0198800 A1 | 12/2002 | Shamrakov |
| 2002/0198806 A1 | 12/2002 | Blagg et al. |
| 2002/0198824 A1 | 12/2002 | Cook |
| 2003/0002671 A1 | 1/2003 | Inchalik et al. |
| 2003/0009415 A1 | 1/2003 | Lutnick et al. |
| 2003/0009418 A1 | 1/2003 | Green et al. |
| 2003/0009426 A1 | 1/2003 | Ruiz-Sanchez |
| 2003/0018549 A1 | 1/2003 | Fei et al. |
| 2003/0018578 A1 | 1/2003 | Schultz |
| 2003/0023531 A1 | 1/2003 | Fergusson |
| 2003/0028466 A1 | 2/2003 | Jenson et al. |
| 2003/0028477 A1 | 2/2003 | Stevenson et al. |
| 2003/0033242 A1 | 2/2003 | Lynch et al. |
| 2003/0041031 A1 | 2/2003 | Hedy |
| 2003/0046311 A1 | 3/2003 | Baidya et al. |
| 2003/0050929 A1 | 3/2003 | Bookman et al. |
| 2003/0061104 A1 | 3/2003 | Thomson et al. |
| 2003/0061163 A1 | 3/2003 | Durfield |
| 2003/0065563 A1 | 4/2003 | Elliott et al. |
| 2003/0069839 A1 | 4/2003 | Whittington et al. |
| 2003/0069943 A1 | 4/2003 | Bahrs et al. |
| 2003/0097342 A1 | 5/2003 | Whittingtom |
| 2003/0097380 A1 | 5/2003 | Mulhern et al. |
| 2003/0105646 A1 | 6/2003 | Siepser |
| 2003/0105733 A1 | 6/2003 | Boreham et al. |
| 2003/0105742 A1 | 6/2003 | Boreham et al. |
| 2003/0115133 A1 | 6/2003 | Bian |
| 2003/0149659 A1 | 8/2003 | Danaher et al. |
| 2003/0154162 A1 | 8/2003 | Danaher et al. |
| 2003/0158960 A1 | 8/2003 | Engberg |
| 2003/0163435 A1 | 8/2003 | Payone |
| 2003/0163513 A1 | 8/2003 | Schaeck et al. |
| 2003/0163733 A1 | 8/2003 | Barriga-Caceres et al. |
| 2003/0171942 A1 | 9/2003 | Gaito |
| 2003/0187768 A1 | 10/2003 | Ryan et al. |
| 2003/0187837 A1 | 10/2003 | Culliss |
| 2003/0195859 A1 | 10/2003 | Lawrence |
| 2003/0204429 A1 | 10/2003 | Botscheck et al. |
| 2003/0204752 A1 | 10/2003 | Garrison |
| 2003/0208412 A1 | 11/2003 | Hillestad et al. |
| 2003/0212654 A1 | 11/2003 | Harper et al. |
| 2003/0216965 A1 | 11/2003 | Libman |
| 2003/0220858 A1 | 11/2003 | Lam et al. |
| 2003/0225742 A1 | 12/2003 | Tenner et al. |
| 2003/0229580 A1 | 12/2003 | Gass et al. |
| 2003/0233323 A1 | 12/2003 | Bilski et al. |
| 2004/0006536 A1 | 1/2004 | Kawashima et al. |
| 2004/0010458 A1 | 1/2004 | Friedman |
| 2004/0015714 A1 | 1/2004 | Abraham et al. |
| 2004/0015715 A1 | 1/2004 | Brown |
| 2004/0019518 A1 | 1/2004 | Abraham et al. |
| 2004/0019799 A1 | 1/2004 | Vering et al. |
| 2004/0024709 A1 | 2/2004 | Yu et al. |
| 2004/0030574 A1 | 2/2004 | DiCostanzo et al. |
| 2004/0030621 A1 | 2/2004 | Cobb |
| 2004/0030629 A1 | 2/2004 | Freeman et al. |
| 2004/0030649 A1 | 2/2004 | Nelson et al. |
| 2004/0039586 A1 | 2/2004 | Garvey et al. |
| 2004/0044563 A1 | 3/2004 | Stein |
| 2004/0044628 A1 | 3/2004 | Mathew et al. |
| 2004/0044673 A1 | 3/2004 | Brady et al. |
| 2004/0046033 A1 | 3/2004 | Kolodziej et al. |
| 2004/0062213 A1 | 4/2004 | Koss |
| 2004/0078323 A1 | 4/2004 | Johnston et al. |
| 2004/0088237 A1 | 5/2004 | Moenickheim et al. |
| 2004/0088255 A1 | 5/2004 | Zielke et al. |
| 2004/0102197 A1 | 5/2004 | Dietz |
| 2004/0107125 A1 | 6/2004 | Guheen et al. |
| 2004/0107250 A1 | 6/2004 | Marciano |
| 2004/0110119 A1 | 6/2004 | Riconda et al. |
| 2004/0111292 A1 | 6/2004 | Hutchins |
| 2004/0111359 A1 | 6/2004 | Hudock |
| 2004/0117302 A1 | 6/2004 | Weichert et al. |
| 2004/0122681 A1 | 6/2004 | Ruvolo et al. |
| 2004/0122696 A1 | 6/2004 | Beringer |
| 2004/0122697 A1 | 6/2004 | Becerra et al. |
| 2004/0128150 A1 | 7/2004 | Lundegren |
| 2004/0128156 A1 | 7/2004 | Beringer et al. |
| 2004/0128230 A1 | 7/2004 | Oppenheimer et al. |
| 2004/0133440 A1 | 7/2004 | Carolan et al. |
| 2004/0133509 A1 | 7/2004 | McCoy et al. |
| 2004/0133513 A1 | 7/2004 | McCoy et al. |
| 2004/0133514 A1 | 7/2004 | Zielke et al. |
| 2004/0133515 A1 | 7/2004 | McCoy et al. |
| 2004/0138995 A1 | 7/2004 | Hershkowitz et al. |
| 2004/0141005 A1 | 7/2004 | Banatwala et al. |
| 2004/0143546 A1 | 7/2004 | Wood et al. |
| 2004/0143596 A1 | 7/2004 | Sirkin |
| 2004/0158521 A1 | 8/2004 | Newton |
| 2004/0158723 A1 | 8/2004 | Root |
| 2004/0159700 A1 | 8/2004 | Khan et al. |
| 2004/0163101 A1 | 8/2004 | Swix |
| 2004/0167793 A1 | 8/2004 | Masuoka et al. |
| 2004/0177035 A1 | 9/2004 | Silva |
| 2004/0186807 A1 | 9/2004 | Nathans et al. |
| 2004/0193538 A1 | 9/2004 | Raines |
| 2004/0193891 A1 | 9/2004 | Ollila |
| 2004/0199456 A1 | 10/2004 | Flint et al. |
| 2004/0199789 A1 | 10/2004 | Shaw et al. |
| 2004/0210661 A1 | 10/2004 | Thompson |
| 2004/0220865 A1 | 11/2004 | Lozowski et al. |
| 2004/0220918 A1 | 11/2004 | Scriffignano et al. |
| 2004/0225545 A1 | 11/2004 | Turner et al. |
| 2004/0225609 A1 | 11/2004 | Greene |
| 2004/0225643 A1 | 11/2004 | Alpha et al. |
| 2004/0230527 A1 | 11/2004 | Hansen et al. |
| 2004/0230534 A1 | 11/2004 | McGough |
| 2004/0236688 A1 | 11/2004 | Bozeman |
| 2004/0243508 A1 | 12/2004 | Samson et al. |
| 2004/0243588 A1 | 12/2004 | Tanner et al. |
| 2004/0249811 A1 | 12/2004 | Shostack |
| 2004/0250107 A1 | 12/2004 | Guo |
| 2004/0254935 A1 | 12/2004 | Chagoly et al. |
| 2004/0255127 A1 | 12/2004 | Arnouse |
| 2004/0267714 A1 | 12/2004 | Frid et al. |
| 2005/0004855 A1 | 1/2005 | Jenson et al. |
| 2005/0010513 A1 | 1/2005 | Duckworth et al. |
| 2005/0015273 A1 | 1/2005 | Iyer |
| 2005/0021476 A1 | 1/2005 | Candella et al. |
| 2005/0021551 A1 | 1/2005 | Silva et al. |

(56) References Cited

U.S. PATENT DOCUMENTS

| | | |
|---|---|---|
| 2005/0027632 A1 | 2/2005 | Zeitoun et al. |
| 2005/0027666 A1 | 2/2005 | Beck |
| 2005/0027983 A1 | 2/2005 | Klawon |
| 2005/0050027 A1 | 3/2005 | Yeh et al. |
| 2005/0055231 A1 | 3/2005 | Lee |
| 2005/0055296 A1 | 3/2005 | Hattersley et al. |
| 2005/0058262 A1 | 3/2005 | Timmins et al. |
| 2005/0060332 A1 | 3/2005 | Bernstein et al. |
| 2005/0071328 A1 | 3/2005 | Lawrence |
| 2005/0086126 A1 | 4/2005 | Patterson |
| 2005/0091164 A1 | 4/2005 | Varble |
| 2005/0097017 A1 | 5/2005 | Hanratty |
| 2005/0097039 A1 | 5/2005 | Kulcsar et al. |
| 2005/0097320 A1 | 5/2005 | Golan et al. |
| 2005/0102180 A1 | 5/2005 | Gailey et al. |
| 2005/0105719 A1 | 5/2005 | Hada |
| 2005/0108396 A1 | 5/2005 | Bittner |
| 2005/0108631 A1 | 5/2005 | Amorin et al. |
| 2005/0114335 A1 | 5/2005 | Wesinger, Jr. et al. |
| 2005/0114344 A1 | 5/2005 | Wesinger, Jr. et al. |
| 2005/0114345 A1 | 5/2005 | Wesinger, Jr. et al. |
| 2005/0125291 A1 | 6/2005 | Demkiw Grayson et al. |
| 2005/0125397 A1 | 6/2005 | Gross et al. |
| 2005/0125686 A1 | 6/2005 | Brandt |
| 2005/0137899 A1 | 6/2005 | Davies et al. |
| 2005/0144452 A1 | 6/2005 | Lynch et al. |
| 2005/0154664 A1 | 7/2005 | Guy et al. |
| 2005/0154665 A1 | 7/2005 | Kerr |
| 2005/0154769 A1 | 7/2005 | Eckart et al. |
| 2005/0208461 A1 | 9/2005 | Krebs et al. |
| 2005/0216434 A1 | 9/2005 | Haveliwala et al. |
| 2005/0216955 A1 | 9/2005 | Wilkins et al. |
| 2005/0226224 A1 | 10/2005 | Lee et al. |
| 2005/0240578 A1 | 10/2005 | Biederman et al. |
| 2005/0251474 A1 | 11/2005 | Shinn et al. |
| 2005/0251820 A1 | 11/2005 | Stefanik et al. |
| 2005/0267840 A1 | 12/2005 | Holm-Blagg et al. |
| 2005/0273431 A1 | 12/2005 | Abel et al. |
| 2005/0279827 A1 | 12/2005 | Mascavage et al. |
| 2005/0288998 A1 | 12/2005 | Verma et al. |
| 2006/0004623 A1 | 1/2006 | Jasti |
| 2006/0004626 A1 | 1/2006 | Holmen et al. |
| 2006/0004731 A1 | 1/2006 | Seibel et al. |
| 2006/0010391 A1 | 1/2006 | Uemura et al. |
| 2006/0031158 A1 | 2/2006 | Orman |
| 2006/0032909 A1 | 2/2006 | Seegar |
| 2006/0036543 A1 | 2/2006 | Blagg et al. |
| 2006/0036748 A1 | 2/2006 | Nusbaum et al. |
| 2006/0041443 A1 | 2/2006 | Horvath |
| 2006/0041464 A1 | 2/2006 | Powers et al. |
| 2006/0041670 A1 | 2/2006 | Musseleck et al. |
| 2006/0059110 A1 | 3/2006 | Madhok et al. |
| 2006/0059362 A1 | 3/2006 | Paden et al. |
| 2006/0074986 A1 | 4/2006 | Mallalieu et al. |
| 2006/0074991 A1 | 4/2006 | Lussier et al. |
| 2006/0079211 A1 | 4/2006 | Degraeve |
| 2006/0080230 A1 | 4/2006 | Freiberg |
| 2006/0080233 A1 | 4/2006 | Mendelovich et al. |
| 2006/0080251 A1 | 4/2006 | Fried et al. |
| 2006/0080263 A1 | 4/2006 | Willis et al. |
| 2006/0085334 A1 | 4/2006 | Murphy |
| 2006/0085361 A1 | 4/2006 | Hoerle et al. |
| 2006/0095289 A1 | 5/2006 | Bunning |
| 2006/0101508 A1 | 5/2006 | Taylor |
| 2006/0106670 A1 | 5/2006 | Cai et al. |
| 2006/0129419 A1 | 6/2006 | Flaxer et al. |
| 2006/0129481 A1 | 6/2006 | Bhatt et al. |
| 2006/0129533 A1 | 6/2006 | Purvis |
| 2006/0131390 A1 | 6/2006 | Kim |
| 2006/0136595 A1 | 6/2006 | Satyavolu |
| 2006/0155639 A1 | 7/2006 | Lynch et al. |
| 2006/0155780 A1 | 7/2006 | Sakairi et al. |
| 2006/0161435 A1 | 7/2006 | Atef et al. |
| 2006/0161554 A1 | 7/2006 | Lucovsky et al. |
| 2006/0173776 A1 | 8/2006 | Shalley et al. |
| 2006/0173792 A1 | 8/2006 | Glass |
| 2006/0178971 A1 | 8/2006 | Owen et al. |
| 2006/0179050 A1 | 8/2006 | Giang et al. |
| 2006/0184585 A1 | 8/2006 | Grear et al. |
| 2006/0195351 A1 | 8/2006 | Bayburtian |
| 2006/0202012 A1 | 9/2006 | Grano et al. |
| 2006/0212386 A1 | 9/2006 | Willey et al. |
| 2006/0212407 A1 | 9/2006 | Lyon |
| 2006/0218407 A1 | 9/2006 | Toms |
| 2006/0223043 A1 | 10/2006 | Dancy-Edwards et al. |
| 2006/0229943 A1 | 10/2006 | Mathias et al. |
| 2006/0229961 A1 | 10/2006 | Lyftogt et al. |
| 2006/0233332 A1 | 10/2006 | Toms |
| 2006/0235935 A1 | 10/2006 | Ng |
| 2006/0239512 A1 | 10/2006 | Petrillo |
| 2006/0242039 A1 | 10/2006 | Haggerty et al. |
| 2006/0242046 A1 | 10/2006 | Haggerty et al. |
| 2006/0242050 A1 | 10/2006 | Haggerty et al. |
| 2006/0253358 A1 | 11/2006 | Delgrosso et al. |
| 2006/0262929 A1 | 11/2006 | Vatanen et al. |
| 2006/0271456 A1 | 11/2006 | Romain et al. |
| 2006/0271457 A1 | 11/2006 | Romain et al. |
| 2006/0271633 A1 | 11/2006 | Adler |
| 2006/0277089 A1 | 12/2006 | Hubbard et al. |
| 2006/0282359 A1 | 12/2006 | Nobili et al. |
| 2006/0282373 A1 | 12/2006 | Stone |
| 2006/0282374 A1 | 12/2006 | Stone |
| 2006/0282429 A1 | 12/2006 | Hernandez-Sherrington et al. |
| 2006/0282819 A1 | 12/2006 | Graham et al. |
| 2006/0287764 A1 | 12/2006 | Kraft |
| 2006/0287765 A1 | 12/2006 | Kraft |
| 2006/0287766 A1 | 12/2006 | Kraft |
| 2006/0287767 A1 | 12/2006 | Kraft |
| 2006/0288090 A1 | 12/2006 | Kraft |
| 2006/0294199 A1 | 12/2006 | Bertholf |
| 2007/0005508 A1 | 1/2007 | Chiang |
| 2007/0005984 A1 | 1/2007 | Florencio et al. |
| 2007/0016500 A1 | 1/2007 | Chatterji et al. |
| 2007/0016501 A1 | 1/2007 | Chatterji et al. |
| 2007/0022141 A1 | 1/2007 | Singleton et al. |
| 2007/0027816 A1 | 2/2007 | Writer |
| 2007/0032240 A1 | 2/2007 | Finnegan et al. |
| 2007/0038568 A1 | 2/2007 | Greene et al. |
| 2007/0040015 A1 | 2/2007 | Carlson et al. |
| 2007/0043577 A1 | 2/2007 | Kasower |
| 2007/0047714 A1 | 3/2007 | Baniak et al. |
| 2007/0055621 A1 | 3/2007 | Tischler et al. |
| 2007/0067206 A1 | 3/2007 | Haggerty et al. |
| 2007/0067297 A1 | 3/2007 | Kublickis |
| 2007/0072190 A1 | 3/2007 | Aggarwal |
| 2007/0073889 A1 | 3/2007 | Morris |
| 2007/0078741 A1 | 4/2007 | Haggerty et al. |
| 2007/0078908 A1 | 4/2007 | Rohatgi et al. |
| 2007/0078985 A1 | 4/2007 | Shao et al. |
| 2007/0083460 A1 | 4/2007 | Bachenheimer |
| 2007/0083463 A1 | 4/2007 | Kraft |
| 2007/0093234 A1 | 4/2007 | Willis et al. |
| 2007/0094137 A1 | 4/2007 | Phillips et al. |
| 2007/0094230 A1 | 4/2007 | Subramaniam et al. |
| 2007/0094241 A1 | 4/2007 | M. Blackwell et al. |
| 2007/0100719 A1 | 5/2007 | Chwast et al. |
| 2007/0112667 A1 | 5/2007 | Rucker |
| 2007/0112668 A1 | 5/2007 | Celano et al. |
| 2007/0121843 A1 | 5/2007 | Atazky et al. |
| 2007/0124235 A1 | 5/2007 | Chakraborty et al. |
| 2007/0124256 A1 | 5/2007 | Crooks et al. |
| 2007/0136109 A1 | 6/2007 | Yager et al. |
| 2007/0143123 A1 | 6/2007 | Goldberg et al. |
| 2007/0156554 A1 | 7/2007 | Nikoley et al. |
| 2007/0156581 A1 | 7/2007 | Imrey et al. |
| 2007/0156692 A1 | 7/2007 | Rosewarne |
| 2007/0160458 A1 | 7/2007 | Yen |
| 2007/0174186 A1 | 7/2007 | Hokland |
| 2007/0174448 A1 | 7/2007 | Ahuja et al. |
| 2007/0174903 A1 | 7/2007 | Greff |
| 2007/0192165 A1 | 8/2007 | Haggerty et al. |
| 2007/0204338 A1 | 8/2007 | Aiello et al. |
| 2007/0205266 A1 | 9/2007 | Carr et al. |
| 2007/0208640 A1 | 9/2007 | Banasiak et al. |

(56) References Cited

U.S. PATENT DOCUMENTS

| | | |
|---|---|---|
| 2007/0220003 A1 | 9/2007 | Chern et al. |
| 2007/0226047 A1 | 9/2007 | Ward |
| 2007/0226130 A1 | 9/2007 | Haggerty et al. |
| 2007/0233591 A1 | 10/2007 | Newton |
| 2007/0239493 A1 | 10/2007 | Sweetland et al. |
| 2007/0240206 A1 | 10/2007 | Wu et al. |
| 2007/0244732 A1 | 10/2007 | Chatterji et al. |
| 2007/0244807 A1 | 10/2007 | Andringa et al. |
| 2007/0245245 A1 | 10/2007 | Blue et al. |
| 2007/0250441 A1 | 10/2007 | Paulsen et al. |
| 2007/0260539 A1 | 11/2007 | Delinsky |
| 2007/0262140 A1 | 11/2007 | Long, Sr. |
| 2007/0266439 A1 | 11/2007 | Kraft |
| 2007/0282736 A1 | 12/2007 | Conlin et al. |
| 2007/0282743 A1 | 12/2007 | Lovelett |
| 2007/0288271 A1 | 12/2007 | Klinkhammer |
| 2007/0288338 A1 | 12/2007 | Hoadley |
| 2007/0288355 A1 | 12/2007 | Roland et al. |
| 2007/0288360 A1 | 12/2007 | Seeklus |
| 2007/0294195 A1 | 12/2007 | Curry et al. |
| 2007/0299770 A1 | 12/2007 | Delinsky |
| 2007/0299771 A1 | 12/2007 | Brody |
| 2008/0010203 A1 | 1/2008 | Grant |
| 2008/0010206 A1 | 1/2008 | Coleman |
| 2008/0010687 A1 | 1/2008 | Gonen et al. |
| 2008/0021802 A1 | 1/2008 | Pendleton |
| 2008/0028446 A1 | 1/2008 | Burgoyne |
| 2008/0033956 A1 | 2/2008 | Saha et al. |
| 2008/0040176 A1 | 2/2008 | Ehling |
| 2008/0047017 A1 | 2/2008 | Renaud |
| 2008/0052182 A1 | 2/2008 | Marshall |
| 2008/0052244 A1 | 2/2008 | Tsuei et al. |
| 2008/0059317 A1 | 3/2008 | Chandran et al. |
| 2008/0059352 A1 | 3/2008 | Chandran |
| 2008/0059364 A1 | 3/2008 | Tidwell et al. |
| 2008/0065569 A1 | 3/2008 | Dutt et al. |
| 2008/0065774 A1 | 3/2008 | Keeler |
| 2008/0066188 A1 | 3/2008 | Kwak |
| 2008/0071682 A1 | 3/2008 | Dominguez |
| 2008/0072316 A1 | 3/2008 | Chang et al. |
| 2008/0077526 A1 | 3/2008 | Arumugam |
| 2008/0082536 A1 | 4/2008 | Schwabe et al. |
| 2008/0083021 A1 | 4/2008 | Doane et al. |
| 2008/0086400 A1 | 4/2008 | Ardelean et al. |
| 2008/0086431 A1 | 4/2008 | Robinson et al. |
| 2008/0091519 A1 | 4/2008 | Foss |
| 2008/0103800 A1 | 5/2008 | Domenikos et al. |
| 2008/0103972 A1 | 5/2008 | Lanc |
| 2008/0109422 A1 | 5/2008 | Dedhia |
| 2008/0109740 A1 | 5/2008 | Prinsen et al. |
| 2008/0114670 A1 | 5/2008 | Friesen |
| 2008/0115226 A1 | 5/2008 | Welingkar et al. |
| 2008/0120155 A1 | 5/2008 | Pliha |
| 2008/0120204 A1 | 5/2008 | Conner et al. |
| 2008/0120569 A1 | 5/2008 | Mann et al. |
| 2008/0120716 A1 | 5/2008 | Hall et al. |
| 2008/0126233 A1 | 5/2008 | Hogan |
| 2008/0133278 A1 | 6/2008 | Stanfield |
| 2008/0133322 A1 | 6/2008 | Kalia et al. |
| 2008/0140507 A1 | 6/2008 | Hamlisch et al. |
| 2008/0140576 A1 | 6/2008 | Lewis et al. |
| 2008/0141346 A1 | 6/2008 | Kay et al. |
| 2008/0148368 A1 | 6/2008 | Zurko et al. |
| 2008/0154758 A1 | 6/2008 | Schattmaier et al. |
| 2008/0154766 A1 | 6/2008 | Lewis et al. |
| 2008/0162317 A1 | 7/2008 | Banaugh et al. |
| 2008/0162350 A1 | 7/2008 | Allen-Rouman et al. |
| 2008/0162383 A1 | 7/2008 | Kraft |
| 2008/0175360 A1 | 7/2008 | Schwarz et al. |
| 2008/0177655 A1 | 7/2008 | Zalik |
| 2008/0183480 A1 | 7/2008 | Carlson et al. |
| 2008/0183585 A1 | 7/2008 | Vianello |
| 2008/0195548 A1 | 8/2008 | Chu et al. |
| 2008/0201257 A1 | 8/2008 | Lewis et al. |
| 2008/0201401 A1 | 8/2008 | Pugh et al. |
| 2008/0208735 A1 | 8/2008 | Balet et al. |
| 2008/0221972 A1 | 9/2008 | Megdal et al. |
| 2008/0222015 A1 | 9/2008 | Megdal et al. |
| 2008/0222027 A1 | 9/2008 | Megdal et al. |
| 2008/0222706 A1 | 9/2008 | Renaud et al. |
| 2008/0228556 A1 | 9/2008 | Megdal et al. |
| 2008/0228635 A1 | 9/2008 | Megdal et al. |
| 2008/0228775 A1 | 9/2008 | Abhyanker et al. |
| 2008/0229415 A1 | 9/2008 | Kapoor et al. |
| 2008/0249869 A1 | 10/2008 | Angell et al. |
| 2008/0255897 A1 | 10/2008 | Megdal et al. |
| 2008/0255992 A1 | 10/2008 | Lin |
| 2008/0270209 A1 | 10/2008 | Mauseth et al. |
| 2008/0270294 A1 | 10/2008 | Lent et al. |
| 2008/0270295 A1 | 10/2008 | Lent et al. |
| 2008/0277465 A1 | 11/2008 | Pletz et al. |
| 2008/0281737 A1 | 11/2008 | Fajardo |
| 2008/0282324 A1 | 11/2008 | Hoal |
| 2008/0288283 A1 | 11/2008 | Baldwin, Jr. et al. |
| 2008/0288299 A1 | 11/2008 | Schultz |
| 2008/0294501 A1 | 11/2008 | Rennich et al. |
| 2008/0294540 A1 | 11/2008 | Celka et al. |
| 2008/0301016 A1 | 12/2008 | Durvasula et al. |
| 2008/0319889 A1 | 12/2008 | Hammad |
| 2008/0319895 A1 | 12/2008 | Lazerson |
| 2009/0006230 A1 | 1/2009 | Lyda et al. |
| 2009/0018996 A1 | 1/2009 | Hunt et al. |
| 2009/0024484 A1 | 1/2009 | Walker et al. |
| 2009/0030776 A1 | 1/2009 | Walker et al. |
| 2009/0037332 A1 | 2/2009 | Cheung et al. |
| 2009/0043691 A1 | 2/2009 | Kasower |
| 2009/0048957 A1 | 2/2009 | Celano |
| 2009/0055322 A1 | 2/2009 | Bykov et al. |
| 2009/0060343 A1 | 3/2009 | Rosca |
| 2009/0064297 A1 | 3/2009 | Selgas et al. |
| 2009/0089190 A1 | 4/2009 | Girulat |
| 2009/0089193 A1 | 4/2009 | Paintin |
| 2009/0094237 A1 | 4/2009 | Churi et al. |
| 2009/0100047 A1 | 4/2009 | Jones et al. |
| 2009/0106141 A1 | 4/2009 | Becker |
| 2009/0106150 A1 | 4/2009 | Pelegero et al. |
| 2009/0106846 A1 | 4/2009 | Dupray et al. |
| 2009/0112650 A1 | 4/2009 | Iwane |
| 2009/0119299 A1 | 5/2009 | Rhodes |
| 2009/0125369 A1 | 5/2009 | Kloostra et al. |
| 2009/0125972 A1 | 5/2009 | Hinton et al. |
| 2009/0126013 A1 | 5/2009 | Atwood et al. |
| 2009/0157693 A1 | 6/2009 | Palahnuk |
| 2009/0158030 A1 | 6/2009 | Rasti |
| 2009/0164380 A1 | 6/2009 | Brown |
| 2009/0171723 A1 | 7/2009 | Jenkins |
| 2009/0172788 A1 | 7/2009 | Vedula et al. |
| 2009/0172795 A1 | 7/2009 | Ritari et al. |
| 2009/0177529 A1 | 7/2009 | Hadi |
| 2009/0177562 A1 | 7/2009 | Peace et al. |
| 2009/0177670 A1 | 7/2009 | Grenier et al. |
| 2009/0183259 A1 | 7/2009 | Rinek et al. |
| 2009/0198557 A1 | 8/2009 | Wang et al. |
| 2009/0198602 A1 | 8/2009 | Wang et al. |
| 2009/0199294 A1 | 8/2009 | Schneider |
| 2009/0204514 A1 | 8/2009 | Bhogal et al. |
| 2009/0204599 A1 | 8/2009 | Morris et al. |
| 2009/0210241 A1 | 8/2009 | Calloway |
| 2009/0210807 A1 | 8/2009 | Xiao et al. |
| 2009/0216640 A1 | 8/2009 | Masi |
| 2009/0217342 A1 | 8/2009 | Nadler |
| 2009/0228918 A1 | 9/2009 | Rolff et al. |
| 2009/0234665 A1 | 9/2009 | Conkel |
| 2009/0234775 A1 | 9/2009 | Whitney et al. |
| 2009/0234876 A1 | 9/2009 | Schigel et al. |
| 2009/0240624 A1 | 9/2009 | James et al. |
| 2009/0247122 A1 | 10/2009 | Fitzgerald et al. |
| 2009/0248573 A1 | 10/2009 | Haggerty et al. |
| 2009/0249451 A1 | 10/2009 | Su et al. |
| 2009/0254375 A1 | 10/2009 | Martinez et al. |
| 2009/0254476 A1 | 10/2009 | Sharma et al. |
| 2009/0254656 A1 | 10/2009 | Vignisson et al. |
| 2009/0254971 A1 | 10/2009 | Herz et al. |
| 2009/0260064 A1 | 10/2009 | Mcdowell et al. |

(56) References Cited

U.S. PATENT DOCUMENTS

| | | |
|---|---|---|
| 2009/0271248 A1 | 10/2009 | Sherman et al. |
| 2009/0271265 A1 | 10/2009 | Lay et al. |
| 2009/0276368 A1 | 11/2009 | Martin et al. |
| 2009/0280467 A1 | 11/2009 | Ahart |
| 2009/0289110 A1 | 11/2009 | Regen et al. |
| 2009/0300066 A1 | 12/2009 | Guo et al. |
| 2009/0307778 A1 | 12/2009 | Mardikar |
| 2009/0313562 A1 | 12/2009 | Appleyard et al. |
| 2009/0327054 A1 | 12/2009 | Yao et al. |
| 2009/0327120 A1 | 12/2009 | Eze et al. |
| 2009/0327270 A1 | 12/2009 | Teevan et al. |
| 2010/0009320 A1 | 1/2010 | Wilkelis |
| 2010/0009332 A1 | 1/2010 | Yaskin et al. |
| 2010/0010935 A1 | 1/2010 | Shelton |
| 2010/0011428 A1 | 1/2010 | Atwood et al. |
| 2010/0023434 A1 | 1/2010 | Bond |
| 2010/0023448 A1 | 1/2010 | Eze |
| 2010/0030578 A1 | 2/2010 | Siddique et al. |
| 2010/0030677 A1 | 2/2010 | Melik-Aslanian et al. |
| 2010/0036697 A1 | 2/2010 | Kelnar |
| 2010/0043055 A1 | 2/2010 | Baumgart |
| 2010/0049803 A1 | 2/2010 | Ogilvie et al. |
| 2010/0063993 A1 | 3/2010 | Higgins et al. |
| 2010/0077483 A1 | 3/2010 | Stolfo et al. |
| 2010/0083371 A1 | 4/2010 | Bennetts et al. |
| 2010/0094768 A1 | 4/2010 | Miltonberger |
| 2010/0094774 A1 | 4/2010 | Jackowitz et al. |
| 2010/0094910 A1 | 4/2010 | Bayliss |
| 2010/0100945 A1 | 4/2010 | Ozzie et al. |
| 2010/0114724 A1 | 5/2010 | Ghosh et al. |
| 2010/0114744 A1 | 5/2010 | Gonen |
| 2010/0114747 A1 | 5/2010 | Kasower |
| 2010/0114776 A1 | 5/2010 | Weller et al. |
| 2010/0122324 A1 | 5/2010 | Welingkar et al. |
| 2010/0122333 A1 | 5/2010 | Noe et al. |
| 2010/0130172 A1 | 5/2010 | Vendrow et al. |
| 2010/0136956 A1 | 6/2010 | Drachev et al. |
| 2010/0145836 A1 | 6/2010 | Baker et al. |
| 2010/0145840 A1 | 6/2010 | Kasower |
| 2010/0153278 A1 | 6/2010 | Farsedakis |
| 2010/0153290 A1 | 6/2010 | Duggan |
| 2010/0161816 A1 | 6/2010 | Kraft et al. |
| 2010/0169159 A1 | 7/2010 | Rose et al. |
| 2010/0174813 A1 | 7/2010 | Hildreth et al. |
| 2010/0179906 A1 | 7/2010 | Hawkes |
| 2010/0185546 A1 | 7/2010 | Pollard |
| 2010/0205076 A1 | 8/2010 | Parson et al. |
| 2010/0205662 A1 | 8/2010 | Ibrahim et al. |
| 2010/0211636 A1 | 8/2010 | Starkenburg et al. |
| 2010/0217837 A1 | 8/2010 | Ansari et al. |
| 2010/0223168 A1 | 9/2010 | Haggerty et al. |
| 2010/0223192 A1 | 9/2010 | Levine et al. |
| 2010/0228658 A1 | 9/2010 | Ketelsen et al. |
| 2010/0229245 A1 | 9/2010 | Singhal |
| 2010/0241535 A1 | 9/2010 | Nightengale et al. |
| 2010/0250338 A1 | 9/2010 | Banerjee et al. |
| 2010/0250410 A1 | 9/2010 | Song et al. |
| 2010/0250411 A1 | 9/2010 | Ogrodski |
| 2010/0250497 A1 | 9/2010 | Redlich et al. |
| 2010/0253686 A1* | 10/2010 | Alsbury et al. ............... 345/440 |
| 2010/0257102 A1 | 10/2010 | Perlman |
| 2010/0257577 A1 | 10/2010 | Grandison et al. |
| 2010/0262932 A1 | 10/2010 | Pan |
| 2010/0268557 A1 | 10/2010 | Faith et al. |
| 2010/0280914 A1 | 11/2010 | Carlson |
| 2010/0281020 A1 | 11/2010 | Drubner |
| 2010/0299251 A1 | 11/2010 | Thomas |
| 2010/0299252 A1 | 11/2010 | Thomas |
| 2010/0299260 A1 | 11/2010 | Thomas |
| 2010/0324986 A1 | 12/2010 | Thomas |
| 2010/0325036 A1 | 12/2010 | Thomas |
| 2010/0325048 A1 | 12/2010 | Carlson et al. |
| 2010/0332393 A1 | 12/2010 | Weller et al. |
| 2011/0004498 A1 | 1/2011 | Readshaw |
| 2011/0004514 A1 | 1/2011 | Thomas |
| 2011/0004546 A1 | 1/2011 | Thomas |
| 2011/0023115 A1 | 1/2011 | Wright |
| 2011/0029388 A1 | 2/2011 | Kendall et al. |
| 2011/0029427 A1 | 2/2011 | Haggerty et al. |
| 2011/0035452 A1 | 2/2011 | Gittleman |
| 2011/0035788 A1 | 2/2011 | White et al. |
| 2011/0040629 A1 | 2/2011 | Chiu et al. |
| 2011/0060673 A1 | 3/2011 | Delinsky et al. |
| 2011/0071950 A1 | 3/2011 | Ivanovic |
| 2011/0078073 A1 | 3/2011 | Annappindi et al. |
| 2011/0083181 A1 | 4/2011 | Nazarov |
| 2011/0112950 A1 | 5/2011 | Haggerty et al. |
| 2011/0113084 A1 | 5/2011 | Ramnani |
| 2011/0113086 A1 | 5/2011 | Long et al. |
| 2011/0113096 A1 | 5/2011 | Long et al. |
| 2011/0126275 A1 | 5/2011 | Anderson et al. |
| 2011/0131123 A1 | 6/2011 | Griffin et al. |
| 2011/0137760 A1 | 6/2011 | Rudie et al. |
| 2011/0142213 A1 | 6/2011 | Baniak et al. |
| 2011/0145899 A1 | 6/2011 | Cao et al. |
| 2011/0148625 A1 | 6/2011 | Velusamy |
| 2011/0166988 A1 | 7/2011 | Coulter |
| 2011/0167011 A1 | 7/2011 | Paltenghe et al. |
| 2011/0178841 A1 | 7/2011 | Rane et al. |
| 2011/0179139 A1 | 7/2011 | Starkenburg et al. |
| 2011/0184780 A1 | 7/2011 | Alderson et al. |
| 2011/0184838 A1 | 7/2011 | Winters et al. |
| 2011/0196791 A1 | 8/2011 | Dominguez |
| 2011/0213641 A1 | 9/2011 | Metzger, II et al. |
| 2011/0264566 A1 | 10/2011 | Brown |
| 2011/0264581 A1 | 10/2011 | Clyne |
| 2011/0270618 A1 | 11/2011 | Banerjee et al. |
| 2011/0276396 A1 | 11/2011 | Rathod |
| 2011/0295733 A1 | 12/2011 | Megdal et al. |
| 2011/0307397 A1 | 12/2011 | Benmbarek |
| 2011/0307434 A1 | 12/2011 | Rostampour et al. |
| 2011/0307957 A1 | 12/2011 | Barcelo et al. |
| 2012/0005070 A1 | 1/2012 | McFall et al. |
| 2012/0011158 A1 | 1/2012 | Avner et al. |
| 2012/0016948 A1 | 1/2012 | Sinha |
| 2012/0022990 A1 | 1/2012 | Kasower |
| 2012/0030216 A1 | 2/2012 | Churi et al. |
| 2012/0030771 A1 | 2/2012 | Pierson et al. |
| 2012/0047219 A1 | 2/2012 | Feng et al. |
| 2012/0054088 A1 | 3/2012 | Edrington et al. |
| 2012/0054592 A1 | 3/2012 | Jaffe et al. |
| 2012/0060105 A1 | 3/2012 | Brown et al. |
| 2012/0066106 A1 | 3/2012 | Papadimitriou |
| 2012/0072382 A1 | 3/2012 | Pearson et al. |
| 2012/0078932 A1 | 3/2012 | Skurtovich, Jr. et al. |
| 2012/0084866 A1 | 4/2012 | Stolfo |
| 2012/0095894 A1* | 4/2012 | Campbell et al. ............... 705/35 |
| 2012/0101938 A1 | 4/2012 | Kasower |
| 2012/0101939 A1 | 4/2012 | Kasower |
| 2012/0110467 A1 | 5/2012 | Blake et al. |
| 2012/0110677 A1 | 5/2012 | Abendroth et al. |
| 2012/0123931 A1 | 5/2012 | Megdal et al. |
| 2012/0124498 A1 | 5/2012 | Santoro et al. |
| 2012/0136763 A1 | 5/2012 | Megdal et al. |
| 2012/0136774 A1 | 5/2012 | Imrey et al. |
| 2012/0151045 A1 | 6/2012 | Anakata et al. |
| 2012/0158574 A1 | 6/2012 | Brunzell et al. |
| 2012/0158654 A1 | 6/2012 | Behren et al. |
| 2012/0173339 A1 | 7/2012 | Flynt et al. |
| 2012/0173417 A1 | 7/2012 | Lohman et al. |
| 2012/0215682 A1 | 8/2012 | Lent et al. |
| 2012/0216125 A1 | 8/2012 | Pierce |
| 2012/0235897 A1 | 9/2012 | Hirota |
| 2012/0239497 A1 | 9/2012 | Nuzzi |
| 2012/0239553 A1 | 9/2012 | Gonen et al. |
| 2012/0246060 A1 | 9/2012 | Conyack, Jr. et al. |
| 2012/0253852 A1 | 10/2012 | Pourfallah et al. |
| 2012/0265607 A1 | 10/2012 | Belwadi |
| 2012/0265661 A1 | 10/2012 | Megdal et al. |
| 2012/0278767 A1 | 11/2012 | Stibel et al. |
| 2012/0290660 A1 | 11/2012 | Rao et al. |
| 2012/0297484 A1 | 11/2012 | Srivastava |
| 2012/0317014 A1 | 12/2012 | Cerise et al. |
| 2012/0324388 A1* | 12/2012 | Rao et al. ..................... 715/771 |

(56) References Cited

U.S. PATENT DOCUMENTS

| | | |
|---|---|---|
| 2013/0006825 A1 | 1/2013 | Robida et al. |
| 2013/0018811 A1 | 1/2013 | Britti et al. |
| 2013/0031109 A1 | 1/2013 | Roulson et al. |
| 2013/0031624 A1 | 1/2013 | Britti et al. |
| 2013/0066775 A1 | 3/2013 | Milam |
| 2013/0080315 A1 | 3/2013 | Torrez et al. |
| 2013/0080467 A1 | 3/2013 | Carson et al. |
| 2013/0085804 A1 | 4/2013 | Leff et al. |
| 2013/0103571 A1 | 4/2013 | Chung et al. |
| 2013/0110557 A1 | 5/2013 | Kasower |
| 2013/0110565 A1 | 5/2013 | Means et al. |
| 2013/0117087 A1 | 5/2013 | Coppinger |
| 2013/0124392 A1 | 5/2013 | Achanta et al. |
| 2013/0125010 A1 | 5/2013 | Strandell |
| 2013/0132151 A1 | 5/2013 | Stibel et al. |
| 2013/0173449 A1 | 7/2013 | Ng et al. |
| 2013/0173450 A1 | 7/2013 | Celka et al. |
| 2013/0173451 A1 | 7/2013 | Kornegay et al. |
| 2013/0185293 A1 | 7/2013 | Boback |
| 2013/0205135 A1 | 8/2013 | Lutz |
| 2013/0211986 A1 | 8/2013 | Debie et al. |
| 2013/0279676 A1 | 10/2013 | Baniak et al. |
| 2013/0298238 A1 | 11/2013 | Shah et al. |
| 2013/0332341 A1 | 12/2013 | Papadimitriou |
| 2013/0332342 A1 | 12/2013 | Kasower |
| 2013/0339249 A1 | 12/2013 | Weller et al. |
| 2014/0012733 A1 | 1/2014 | Vidal |
| 2014/0012737 A1 | 1/2014 | Evans |
| 2014/0019348 A1 | 1/2014 | Daley |
| 2014/0032300 A1 | 1/2014 | Zhang et al. |
| 2014/0032723 A1 | 1/2014 | Nema |
| 2014/0061302 A1 | 3/2014 | Hammad |
| 2014/0089167 A1 | 3/2014 | Kasower |
| 2014/0096249 A1 | 4/2014 | Dupont et al. |
| 2014/0110477 A1 | 4/2014 | Hammad |
| 2014/0129942 A1 | 5/2014 | Rathod |
| 2014/0156501 A1 | 6/2014 | Howe |
| 2014/0164398 A1 | 6/2014 | Smith et al. |
| 2014/0164519 A1 | 6/2014 | Shah |
| 2014/0279329 A1 | 9/2014 | Dancel |
| 2014/0298485 A1 | 10/2014 | Gardner |

FOREIGN PATENT DOCUMENTS

| | | |
|---|---|---|
| EP | 0 913 789 | 5/1999 |
| EP | 1 122 664 | 8/2001 |
| EP | 1 239 378 | 1/2002 |
| EP | 1 301 887 | 4/2003 |
| EP | 1 850 278 | 10/2007 |
| GB | 2 102 606 | 2/1983 |
| JP | 2003-016261 | 1/2003 |
| JP | 2005-208945 | 8/2005 |
| KR | 2000-0063313 | 11/2000 |
| KR | 2002-0039203 | 5/2002 |
| KR | 10-2004-0078798 | 9/2004 |
| KR | 10-2007-0081504 | 8/2007 |
| WO | WO 91/16691 | 10/1991 |
| WO | WO 99/004350 | 1/1999 |
| WO | WO 99/046710 | 9/1999 |
| WO | WO 00/011574 | 3/2000 |
| WO | WO 00/55778 | 9/2000 |
| WO | WO 01/09752 | 2/2001 |
| WO | WO 01/09792 | 2/2001 |
| WO | WO 01/057720 | 8/2001 |
| WO | WO 01/075754 | 10/2001 |
| WO | WO 01/084281 | 11/2001 |
| WO | WO 02/029636 | 4/2002 |
| WO | WO 03/101123 | 12/2003 |
| WO | WO 2004/031986 | 4/2004 |
| WO | WO 2004/114160 | 12/2004 |
| WO | WO 2005/010683 | 2/2005 |
| WO | WO 2005/022348 | 3/2005 |
| WO | WO 2005/033979 | 4/2005 |
| WO | WO 2006/050278 | 5/2006 |
| WO | WO 2006/069199 | 6/2006 |
| WO | WO 2006/099492 | 9/2006 |
| WO | WO 2007/149941 | 12/2007 |
| WO | WO 2008/042614 | 4/2008 |
| WO | WO 2008/147918 | 12/2008 |
| WO | WO 2009/064694 | 5/2009 |
| WO | WO 2009/102391 | 8/2009 |
| WO | WO 2010/001406 | 1/2010 |
| WO | WO 2010/062537 | 6/2010 |
| WO | WO 2010/077989 | 7/2010 |
| WO | WO 2010/150251 | 12/2010 |
| WO | WO 2011/005876 | 1/2011 |
| WO | WO 2013/009920 | 1/2013 |

OTHER PUBLICATIONS

U.S. Appl. No. 12/705,511, filed Feb. 12, 2010, Bargoli et al.

Avery et al., "Consumer Credit Scoring: Do Situational Circumstances Matter?" Journal of Banking & Finance, vol. 28, 2004, pp. 835-856.

CreditAnalyst, Digital Matrix Systems, as printed out Mar. 4, 2008, pp. 2.

CreditToolkit, Digital Matrix Systems, as printed out Mar. 4, 2008, pp. 2.

CreditXpert, http://www.creditxpert.com/Products/individuals.asp printed Oct. 12, 2012 in 1 page.

"Consumers Gain Immediate and Full Access to Credit Score Used by Majority of U.S. Lenders." PR Newswire, ProQuest Copy; Mar. 19, 2001; p. 1.

CreditXpert Inc., CreditXpert 3-Bureau Comparison™, [online] [retrieved on Jun. 7, 2005] Retrieved from the internet http://www.creditxpert.com/CreditXpert%203-Bureau%20Comparison(TM)%20sample.pdf, 2002.

CreditXpert Inc., CreditXpert Credit Score & Analysis, [online] [retrieved on Jun. 7, 2005] Retrieved from the internet http://www.creditxpert.com/CreditXpert%20Score%20&%20Analysis%20and%20Credit%20Wizard%20sample.pdf, 2002.

CreditXpert Inc., CreditXpert Essentials™, Advisor View-Experian Jul. 7, 2003, [online] [retrieved on Nov. 29, 2004] Retrieved from the internet http://www.creditxpert.com/cx_ess_app.pdf, 2004., Issue Wallace.

CreditXpert Inc., CreditXpert Essentials™, Advisor View-TransUnion, [online] [retrieved on Jun. 7, 2005] Retrieved from the internet http://www.creditxpert.com/cx_ess_app.pdf, 2004., Issue Wallace.

CreditXpert Inc., CreditXpert Essentials™, Applicant View, [online] [retrieved on Jun. 7, 2005] Retrieved from the internet http://www.creditxpert.com/cx_ess_app.pdf, 2004.

CreditXpert Inc., CreditXpert What-If Simulator™, [online] [retrieved on Jun. 7, 2005] Retrieved from the internet http://www.creditxpert.com/CreditXpert%20What-If%20Simulator(TM)%20sample.pdf, 2002.

Demby, Elayne, "Special Report: Letting Consumers Know the Score—and More", Collections and Credit Risk, New York, Feb. 2003, vol. 8, Issue 2, p. 53, pp. 3.

eFunds Introduces QualiFileSM, Deluxe Corporation, Sep. 1999, Milwaukee, WI.

Ettorre, Paul Kahn on Exceptional Marketing, Management Review, vol. 38(11), Nov. 1994, pp. 48-51.

"Equifax and FICO Serve Consumers", Mar. 2001.

Expensr.com http://www.expensr.com/, as retrieved on Sep. 17, 2008.

Experian, Custom Strategist and Qualifile from Funds, 2000, in 2 pages.

Fair Isaac Corporation, myFICO: Calculators: Credit Assessment, [online] [retrieved on Jun. 8, 2005] Retrieved from the internet http://www.myfico.com/CreditEducation/Calculators/CreditAssessment.aspx, 2005.

Fair Isaac Corporation, myFICO: Help: FICO Score Simulator, [online] [retrieved on Jun. 8, 2005] Retrieved from the internet http://www.myfico.com/Help/Simulator.aspx?fire=5, 2005.

(56) References Cited

OTHER PUBLICATIONS

Fair Isaac Corporation, myFICO: Products: Suze Orman's FICO Kit Platinum, [online] [retrieved on Jun. 8, 2005] Retrieved from the internet http://www.myfico.com/Products/FICOKit/Description.aspx, 2005.

Fair Isaac Corporation, myFICO: Products: Suze Orman's FICO® Kit Platinum: FICO Score Check, [online] [retrieved on Jun. 7, 2005] Retrieved from the internet http://www.myfico.com/Products/FICOKit/Sample03.html, 2005.

Fair Isaac Corporation, myFICO: Sample: FICO Score Simulator: "Max Out" Your Credit Cards, [online] [retrieved on Jun. 8, 2005] Retrieved from the internet http://www.myfico.com/Content/Samples/Sample_ScoreSimulatorResults.asp?Simulation=4&ReportID.

Fair Isaac Corporation, myFICO: Sample: FICO Score Simulator: Miss Payments, [online] [retrieved on Jun. 8, 2005] Retrieved from the internet http://www.myfico.com/Content/Samples/Sample_ScoreSimulatorResults.asp?miss_payment=radiobutton&Simulation=.

Fair Isaac Corporation, myFICO: Sample: FICO Score Simulator: Pay Down Delinquent Balances First, [online] [retrieved on Jun. 8, 2005] Retrieved from the internet http://www.myfico.com/Content/Samples/Sample_ScoreSimulatorResults.asp?textfieldCC=750.

Fair Isaac Corporation, myFICO: Sample: FICO Score Simulator: Suggested Best Action, [online] [retrieved on Jun. 8, 2005] Retrieved from the internet http://www.myfico.com/Content/Samples/Sample_ScoreSimulatorResults.asp?Simulation=111&ReportID=1&Pr.

Fisher, Joseph, "Access to Fair Credit Reports: Current Practices and Propsed Legislation," American Business Law Journal, Fall 1981, vol. 19, No. 3, p. 319.

IDEON, Credit-Card Registry that Bellyflopped this Year, Is Drawing some Bottom-Fishers, The Wall Street Journal, Aug. 21, 1995, pp. C2.

"Judging Credit: Consumers Need Better Finance Tools", News Journal, Daytona Beach, FL, Dec. 28, 2002.

Lee, W.A., "Experian Eyes Payments, Mulls Deals" American Banker: The Financial Services Daily, 2pgs., New York, NY, May 30, 2003.

Lee, W.A.; "Fair Isaac Taps Institutions for Credit Score Distribution", American Banker: The Financial Services Daily, New York, NY, Apr. 9, 2002, vol. 167, Issue 67, 1 Page.

Lee, W.A., "Money, Quicken, and the Value of Alliances", American Banker: The Financial Services Daily, 2pgs., New York, NY, Jul. 28, 2003.

Miller, Margaret, "Credit Reporting Systems Around the Globe: The State of the Art in Public and Private Credit Registries", Jun. 2000, pp. 32, http://siteresources.worldbank.org/INTRES/Resources/469232-1107449512766/Credit_Reporting_Systems_Around_the Globe.pdf.

Occasional CF Newsletter; http://www.halhelms.com/index.cfm?fuseaction=newsletters.oct1999; Oct. 1999.

Pagano, et al., "Information Sharing in Credit Markets," Dec. 1993, The Journal of Finance, vol. 48, No. 5, pp. 1693-1718.

Partnoy, Frank, Rethinking Regulation of Credit Rating Agencies: An Institutional Investor Perspective, Council of Institutional Investors, Apr. 2009, pp. 21.

Powerforms: Declarative Client-Side for Field Validation, ISSN 1386-145x, Dec. 2000.

Singletary, Michelle "Ratings for the Credit Raters", The Washington Post, The Color of Money column, Mar. 24, 2002 in 1 page.

Singletary, Michelle, "Score One for Open Credit Ratings", The Washington Post, Washington DC, Jun. 18, 2000, 3 pages.

Stanton, T.H., "Credit Scoring and Loan Scoring as Tools for Improved Management of Federal Credit Programs", Financier, Philadelphia, Summer 1999, vol. 6, 36 pages.

Stein, Benchmarking Default Prediction Models: Pitfalls and Remedies in Model Validation, Moody's KMV, Revised Jun. 13, 2002, Technical Report #020305; New York.

Watts, Craig, "Consumers Now Can Know What Loan Rate Offers to Expect Based on Their FICO Credit Score at MyFICO.com," Mar. 6, 2002, http://www.myfico.com/PressRoom/PressReleases/2002_03_06.aspx.

Watts, Craig, "Fair, Isaac and Equifax Give Consumers New Score Power Tools Offering Greater Insights for Managing Their Credit Health," May 21, 2002, http://www.myfico.com/PressRoom/PressReleases/2002_05_21.aspx.

Webpage printed from http://www.magnum.net/pdfs/RapUpBrochure.pdf as printed Mar. 3, 2008.

West, David, "Neural Network Credit Scoring Models", Computers & Operations Research, vol. 27, 2000, pp. 1131-1152.

Yücesan et al., "Distributed web-based simulation experiments for optimization", Simulation Practice and Theory 9 (2001), pp. 73-90.

Zimmerman et al., "A web-based platform for experimental investigation of electric power auctions", Decision Support Systems 24 (1999), pp. 193-205.

Zoot—Instant Rules GUI, www.zootweb.com/instant_rules_GUI.html as printed Mar. 3, 2008.

Zoot—Rules Management GUI, www.zootweb.com/business_rules_GUI.html as printed Mar. 3, 2008.

International Search Report and Written Opinion for Application No. PCT/US2012/046316, dated Sep. 28, 2012.

U.S. Appl. No. 14/226,499 (U.S. Pat. No. 9,058,627) filed Mar. 26, 2014, including its prosecution history, including without limitation Notice of Allowances, Office Actions, Amendments, Remarks, and any other potentially relevant documents.

Actuate, "Delivering Enterprise Information for Corporate Portals", White Paper, 2004, pp. 1-7.

"Aggregate and Analyze Social Media Content: Gain Faster and Broader Insight to Market Sentiment," SAP Partner, Mantis Technology Group, Apr. 2011, pp. 4.

Aktas et al., "Personalizing PageRank Based on Domain Profiles", WEBKDD workshop: Webmining and Web Usage Analysis, Aug. 22, 2004, pp. 83-90.

Aktas et al., "Using Hyperlink Features to Personalize Web Search", WEBKDD workshop: Webmining and Web Usage Analysis, Aug. 2004.

"Arizona Company Has Found Key in Stopping ID Theft," PR Newswire, New York, Aug. 10, 2005 http://proquest.umi.com/pqdweb?did=880104711&sid=1&Fmt=3&clientId=19649&RQT=309&Vname=PQD.

ABC News Now:Money Matters, as broadcasted Nov. 15, 2005 with guest Todd Davis (CEO of Lifelock), pp. 6.

Anonymous, "Credit-Report Disputes Await Electronic Resolution," Credit Card News, Chicago, Jan. 15, 1993, vol. 5, No. 19, p. 5.

Anonymous, "MBNA Offers Resolution of Credit Card Disputes," Hempstead, Feb. 2002, vol. 68, No. 2, p. 47.

Anonymous, "Feedback", Credit Management, ABI/INFORM Global, Sep. 2006, pp. 6.

Awoonor-Williams, Princess Josephine, Ph.D. "Gender and Credit: An Analysis of Women's Experience in the Credit Market", ProQuest Dissertations and Theses, 2004, pp. 148.

"Beware of 'Who Viewed My Profile' Apps on Facebook" Tech for Luddites, Mar. 15, 2010 printed Sep. 27, 2013 http://www.techforluddites.com/2010/03/beware-of-who-viewed-my-profile-apps-on-facebook.html.

Bielski, Lauren, "Will you Spend to Thwart ID Theft?" ABA Banking Journal, Apr. 2005, pp. 54, 56-57, 60.

BlueCava, "What We Do", http://www.bluecava.com/what-we-do/, printed Nov. 5, 2012 in 3 pages.

Buxfer, http://www.buxfer.com/ printed Feb. 5, 2014 in 1 pages.

Check, http://check.me/ printed Feb. 5, 2014 in 3 pages.

Chores & Allowances, "Do Kids Have Credit Reports?" Oct. 15, 2007, http://choresandallowances.blogspot.com/2007/10/do-kids-have-credit-reports.html, pp. 5.

Comlounge.net, "plonesocial.auth.rpx" http://web.archive.org/web/20101026041841/http://comlounge.net/rpx as captured Oct. 26, 2010 in 9 pages.

CreditKarma, http://www.creditkarma.com printed Feb. 8, 2013 in 2 pages.

CreditSesame, http://www.creditsesame.com/how-it-works/our-technology/ printed Feb. 5, 2013 in 2 pages.

(56) References Cited

OTHER PUBLICATIONS

Collins, Michael J., "Exploring the Design of Financial Counseling for Mortgage Borrowers in Default," Journal of Family and Economic Issues, Springer Science+Business Media, Mar. 13, 2007, pp. 207-226.
"CreditCheck Monitoring Services," Dec. 11, 2000, pp. 1, lines 21-23.
"Credit Improvement", CreditRepair.com, Mar. 10, 2010, http://web.archive.org/web/20100310134914/http://www.creditrepair.com/credit/, as archived Mar. 10, 2010 in 2 pages.
Credit Plus, Inc., "Score Wizard", http://web.archive.org/web/20030806080310/www.creditplus.com/scorewizard.asp, as archived Aug. 6, 2003 in 1 page.
Cullen, Terri; "The Wall Street Journal Complete Identity Theft Guidebook:How to Protect Yourself from the Most Pervasive Crime in America"; Chapter 3, pp. 59-79; Jul. 10, 2007.
"D&B Corporate Family Linkage", D&B Internet Access for U.S. Contract Customers, https://www.dnb.com/ecomp/help/linkage.htm as printed Dec. 17, 2009, pp. 1.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.
Day, Jo and Kevin; "ID-ology: A Planner's Guide to Identity Theft"; Journal of Financial Planning:Tech Talk; pp. 36-38; Sep. 2004.
"Debt Settlement: Watch Video on how to Pay Your Debt Faster", http://www.debtconsolidationcare.com/debt-settlement.html printed Jan. 9, 2013 in 6 pages.
Elliehausen et al., The Impact of Credit Counseling on Subsequent Borrower Behavior, The Journal of Consumer Affairs, Summer 2007, vol. 41, No. 1, pp. 1-28.
Equifax Consumer Credit Report http://www.equifax.com/home/, as retrieved on Sep. 17, 2008.
Equifax; "Equifax Credit Watch"; https://www.econsumer.equifax.co.uk/consumer/uk/sitepage.ehtml, dated Jun. 27, 2007 on www.archive.org.
"Equifax: Debt Wise™ Credit Monitoring Service," Product Review, http://www.mdmproofing.com/iym/reviews/equifax/debt-wise/, Jan. 2010, pp. 11.
Equifax; "Welcome to Equifax Mobile," http://www.equifax.com/mobile/ as printed Mar. 18, 2011 in 2 pages.
Experian Consumer Credit Report http://www.experian.com/, as retrieved on Sep. 17, 2008.
Facebook, "Facebook helps you connect and share with the people in your life," www.facebook.com printed Nov. 16, 2010 in 1 page.
FamilySecure.com, "Frequently Asked Questions", http://www.familysecure.com/FAQ.aspx as archived Jul. 15, 2007 in 3 pages.
FamilySecure.com; "Identity Theft Protection for the Whole Family | FamilySecure.com" http://www.familysecure.com/, as retrieved on Nov. 5, 2009.
Fenner, Peter, "Mobil Address Management and Billing for Personal Communications", 1st International Conference on Universal Personal Communications, 1992, ICUPC '92 Proceedings, pp. 253-257.
"Fictitious Business Name Records", Westlaw Database Directory, http://directoy.westlaw.com/scope/default.asp?db=FBN-ALL&RS-W . . . &VR=2.0 as printed Dec. 17, 2009, pp. 5.
Fitzpatrick, Alex, "Facebook Monitors Your Chats for Criminal Activity [Report]," Mashable, Jul. 12, 2012 printed Sep. 27, 2013 http://mashable.com/2012/07/12/facebook-scanning-chats/.
"Fund Manager," Portfolio Management Software website, indexed into Google on Jan. 7, 2005, Retrieved Oct. 24, 2014 http://www.fundmanagersoftware.com/, http://www.fundmanagersoftware.com/help/gph_tp_pieasset.html, http://www.fundmanagersoftware.com/demo2.html.
Gibbs, Adrienne; "Protecting Your Children from Identity Theft," Nov. 25, 2008, http://www.creditcards.com/credit-card-news/identity-ID-theft-and-kids-children-1282.php, pp. 4.
"GLBA Compliance and FFIEC Compliance" http://www.trustwave.com/financial-services.php printed Apr. 8, 2013 in 1 page.
Gordon et al., "Identity Fraud: A Critical National and Global Threat," LexisNexis, Oct. 28, 2003, pp. 1-48.
"Guide to Benefits, MasterCard® Cardholder Smart Shopper Benefits", May 2005, pp. 10.
Herzberg, Amir, "Payments and Banking with Mobile Personal Devices," Communications of the ACM, May 2003, vol. 46, No. 5, pp. 53-58.
Hoofnagle, Chris Jay, "Identity Theft: Making the Known Unknowns Known," Harvard Journal of Law & Technology, Fall 2007, vol. 21, No. 1, pp. 98-122.
Hunt, Robert M.; Whither Consumer Credit Counseling? Business Review, Dec. 31, 2005, pp. 9-20.
ID Analytics, "ID Analytics® Consumer Notification Service" printed Apr. 16, 2013 in 2 pages.
ID Theft Assist, "Do You Know Where Your Child's Credit Is?", Nov. 26, 2007, http://www.idtheftassist.com/pages/story14, pp. 3.
"ID Thieves These Days Want Your Number, Not Your Name", The Colombus Dispatch, Columbus, Ohio, http://www.dispatch.com/content/stories/business/2014/08/03/id-thieves-these-days-want-your-number-not-your-name.html, Aug. 3, 2014 in 2 pages.
Identity Theft Resource Center; Fact Sheet 120 A—to Order a Credit Report for a Child; Fact Sheets, Victim Resources; Apr. 30, 2007.
"Identity Thieves Beware: Lifelock Introduces Nation's First Guaranteed Proactive Solution to Identity Theft Protection," PR Newswire, New York, Jun. 13, 2005 http://proquest.umi.com/pqdweb?did=852869731&sid=1&Fmt=3&clientId=19649&RQT=309&Vname=PQD.
Information Brokers of America, "Information Brokers of America Child Identity Theft Protection" http://web.archive.org/web/20080706135451/http://iboainfo.com/child-order.html as archived Jul. 6, 2008 in 1 page.
Information Brokers of America, "Safeguard Your Child's Credit", http://web.archive.org/web/20071215210406/http://www.iboainfo.com/child-id-protect.html as archived Dec. 15, 2007 in 1 page.
Intelius, "People Search—Updated Daily, Accurate and Fast!" http://www.intelius.com/people-search.html?=&gclid=CJqIZP7paUCFYK5KgodbCUJJQ printed Nov. 16, 2010 in 1 page.
iovation, Device Identification & Device Fingerprinting, http://www.iovation.com/risk-management/device-identification printed Nov. 5, 2012 in 6 pages.
Irby, LaToya, "How Will a Late Payment Hurt My Credit Score?" http://web.archive.org/web/20101024113603/http://credit.about.com/od/creditscorefaq/f/how-late-payment-affects-credit-score.htm, Oct. 24, 2010, pp. 1.
Lan, Joe, "The Top Portfolio Management Software," http://www.aaii.com/computerizedinvesting/article/the-top-portfolio-management-software, Includes Discussion thread, Fourth Quarter 2011, pp. 17.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
Lee, W.A.; "Experian, on Deal Hunt, Nets Identity Theft Insurer", American Banker: The Financial Services Daily, Jun. 4, 2003, New York, NY, 1 page.
Leskovec, Jure, "Social Media Analytics: Tracking, Modeling and Predicting the Flow of Information through Networks", WWW 2011-Tutorial, Mar. 28-Apr. 1, 2011, Hyderabad, India, pp. 277-278.
Letter to Donald A. Robert from Carolyn B. Maloney, dated Oct. 31, 2007, pp. 2.
Letter to Donald A. Robert from Senator Charles E. Schumer, dated Oct. 11, 2007, pp. 2.
Letter to Harry C. Gambill from Carolyn B. Maloney, dated Oct. 31, 2007, pp. 2.
Letter to Harry C. Gambill from Senator Charles E. Schumer, dated Oct. 11, 2007, pp. 2.
Letter to Richard F. Smith from Carolyn B. Maloney, dated Oct. 31, 2007, pp. 2.
Letter to Richard F. Smith from Senator Charles E. Schumer, dated Oct. 11, 2007, pp. 2.

(56) References Cited

OTHER PUBLICATIONS

Li et al., "Automatic Verbal Information Verification for User Authentication", IEEE Transactions on Speech and Audio Processing, vol. 8, No. 5, Sep. 2000, pp. 585-596.
LifeLock, "How LifeLock Works," http://www.lifelock.com/lifelock-for-people printed Mar. 14, 2008 in 1 page.
LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.
LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.
LifeLock, Various Pages, www.lifelock.com/, 2007.
Littwin, Angela, "Beyond Usury: A Study of Credit-Card Use and Preference Among Low-Income Consumers", Texas Law Review, vol. 86, No. 3, pp. 451-506; Feb. 2008.
Lobo, Jude, "MySAP.com Enterprise Portal Cookbook," SAP Technical Delivery, Feb. 2002, vol. 1, pp. 1-13.
Lund, Graham, "Credit Bureau Data: Maximizing the Benefits," Credit Management, May 2004, ProQuest Central, pp. 44-45.
Magid, Lawrence, J., Business Tools: When Selecting an ASP Ensure Data Mobility, Los Angeles Times, Los Angeles, CA, Feb. 26, 2001, vol. C, Issue 4, pp. 3.
"Managing Debt?" Federal Trade Commission: Consumer Information, http://www.consumer.ftc.gov/articles/0158-managing-debt, printed Mar. 22, 2013 in 4 pages.
Manilla, http://www.manilla.com/how-it-works/ printed Feb. 5, 2014 in 1 page.
Meyers et al., "Using Your Social Networking Accounts to Log Into NPR.org," NPR.org, Jun. 24, 2010, http://web.archive.org/web/20100627034054/http://www.npr.org/blogs/inside/2010/06/24/128079309 /using-your-social-networking-accounts-to-log-into-npr-org in 3 pages.
Micarelli et al., "Personalized Search on the World Wide Web," The Adaptive Web, LNCS 4321, 2007, pp. 195-230.
Microsoft, "Expand the Reach of Your Business," Microsoft Business Solutions, 2004, in 16 pages.
Mint.com, http://www.mint.com/ printed Sep. 18, 2008 in 2 pages.
Mint.com, http://www.mint.com/how-it-works/ printed Feb. 5, 2013 in 2 pages.
MS Money Software by Microsoft http://www.microsoft.com/Money/default.mspx as retrieved on Sep. 17, 2008.
Mvelopes, http://www.mvelopes.com/ printed Feb. 5, 2014 in 2 pages.
My Call Credit http://www.mycallcredit.com/products.asp?product=ALR dated Dec. 10, 2005 on www.archive.org.
My Call Credit http://www.mycallcredit.com/rewrite.asp?display=faq dated Dec. 10, 2005 on www.archive.org.
My ID Alerts, "Why ID Alerts" http://www.myidalerts.com/why-id-alerts.jsps printed Apr. 3, 2012 in 2 pages.
My ID Alerts, "How it Works" http://www.myidalerts.com/how-it-works.jsps printed Apr. 3, 2012 in 3 pages.
MyReceipts, http://www.myreceipts.com/, printed Oct. 16, 2012 in 1 page.
MyReceipts—How it Works, http://www.myreceipts.com/howItWorks.do, printed Oct. 16, 2012 in 1 page.
"Name Availability Records", Westlaw Database Directory, http://directoy.westlaw.com/scope/default.asp?db=NA-ALL&RS=W . . . &VR=2.0 as printed Dec. 17, 2009, pp. 5.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm" DVD and Child Identification Kit, Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.
"New for Investors: Asset Allocation, Seasoned Returns and More," Prosper, http://blog.prosper.com/2011/10/27/new-for-investors-asset-allocation-seasoned-returns-and-more/, pp. 4.
Next Card: About Us, http://web.cba.neu.edu/~awatson/NextCardCase/NextCardAboutUs.htm printed Oct. 23, 2009 in 10 pages.
Ogg, Erica, "Apple Cracks Down on UDID Use", http://gigaom.com/apple/apple-cracks-down-on-udid-use/ printed Nov. 5, 2012 in 5 Pages.
Organizing Maniac's Blog—Online Receipts Provided by MyQuickReceipts.com, http://organizingmaniacs.wordpress.com/2011/01/12/online-receipts-provided-by-myquickreceipts-com/ dated Jan. 12, 2011 printed Oct. 16, 2012 in 3 pages.
Paustian, Chuck, "Every Cardholder a King Customers get the Full Treatment at Issuers' Web Sites," Card Marketing, New York, Mar. 2001, vol. 5, No. 3, pp. 4.
People Finders, http://www.peoplefinders.com/?CMP=Google&utm_source=google&utm_medium=cpc printed Nov. 16, 2010 in 1 page.
People Lookup, "Your Source for Locating Anyone!" www.peoplelookup.com/people-search.html printed Nov. 16, 2010 in 1 page.
People Search, "The Leading Premium People Search Site on the Web," http://www.peoplesearch.com printed Nov. 16, 2010 in 2 pages.
PersonalCapital.com, http://www.personalcapital.com/how-it-works printed Feb. 5, 2014 in 5 pages.
Planwise, http://planwise.com printed Feb. 8, 2013 in 5 pages.
Planet Receipt—Home, http://www.planetreceipt.com/home printed Oct. 16, 2012 in 2 pages.
Planet Receipt—Solutions & Features, http://www.planetreceipt.com/solutions-features printed Oct. 16, 2012 in 2 pages.
Press Release—"Helping Families Protect Against Identity Theft—Experian Announces FamilySecure.com; Parents and guardians are alerted for signs of potential identity theft for them and their children; product features an industry-leading $2 million guarantee"; PR Newswire; Irvine, CA; Oct. 1, 2007.
Privacy Rights Clearinghouse, "Identity Theft: What to do if it Happens to You," http://web.archive.org/web/19990218180542/http://privacyrights.org/fs/fs17a.htm printed Feb. 18, 1999.
"Qualifying for Debt Settlement", http://www.certifieddebt.com/debt/settlement-qualifications.shtml printed Jan. 9, 2013 in 2 pages.
Quantix Software, "Investment Account Manager," available at https://www.youtube.com/watch?v=1UwNTEER1Kk, as published Mar. 21, 2012.
Quicken Online by Intuit http://www.quicken.intuit.com/, as retrieved on Sep. 17, 2008.
"Quicken Support", http://web.archive.org/web/20071231040130/http://web.intuit.com/support/quicken/docs/d_qif.html as archived Dec. 31, 2007 in 6 pages.
Ramaswamy, Vinita M., Identity-Theft Toolkit, The CPA Journal, Oct. 1, 2006, vol. 76, Issue 10, pp. 66-70.
Rawe, Julie; "Identity Thieves", Time Bonus Section, Inside Business, Feb. 2002, pp. 2.
Repici et al., "The Comma Separated Value (CSV) File Format", http://creativyst.com/Doc/Articles/CSV/CSV01.htm, Creativyst, Inc., 2002, pp. 10.
"Resolve Debt for Less: With Help from Freedom Financial" http://www.debtsettlementusa.com/ printed Jan. 9, 2013 in 6 pages.
Romig, Shane, "The Truth About Credit Repair", Credit.com, May 5, 2010, http://web.archive.org/web/20100505055526/http://www.credit.com/credit_information/credit_help/The-Truth-About-Credit-Repair.jsp printed Mar. 22, 2013 in 4 pages.
Roth, Andrew, "CheckFree to Introduce E-Mail Billing Serving," American Banker, New York, Mar. 13, 2001, vol. 166, No. 49, pp. 3.
SAS, "SAS® Information Delivery Portal", Fact Sheet, 2008, in 4 pages.

(56) References Cited

OTHER PUBLICATIONS

Scholastic Inc.:Parent's Request for Information http://web.archive.org/web/20070210091055/http://www.scholastic.com/inforequest/index.htm as archived Feb. 10, 2007 in 1 page.

Scholastic Inc.:Privacy Policy http://web.archive.org/web/20070127214753/http://www.scholastic.com/privacy.htm as archived Jan. 27, 2007 in 3 pages.

Screenshot for Investment Account Manager v.2.8.3, published at http://www.aaii.com/objects/get/1642.gif by at least Aug. 30, 2011 in 1 page.

"Settling Your Debts—Part 1 in Our Debt Settlement Series", http://www.creditinfocenter.com/debt/settle_debts.shtml printed Jan. 9, 2013 in 6 pages.

ShoeBoxed, https://www.shoeboxed.com/sbx-home/ printed Oct. 16, 2012 in 4 pages.

Simpson, Glyn, "Microsoft (MS) Money (MSMoney FAQ, Help and Information Pages", pp. 2, Copyright © Glyn Simpson 1998-2007, http://web.archive.org/web/20071018075531/http://money.mvps.org/faq/article/196.aspx.

Singletary, Michelle, "The Littlest Victims of ID Theft", The Washington Post, The Color of Money, Oct. 4, 2007.

Stauffer et al., "Using HTML 3.2," Second Edition, 1996, Que Publishing, pp. 192-193.

"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.

TransUnion Consumer Credit Report http://www.transunion.com/, as retrieved on Sep. 17, 2008.

Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.

US Legal, Description, http://www.uslegalforms.com/us/US-00708-LTR.htm printed Sep. 4, 2007 in 2 pages.

Vamosi, Robert, "How to Handle ID Fraud's Youngest Victims," Nov. 21, 2008, http://news.cnet.com/8301-10789_3-10105303-57.html.

Waggoner, Darren J., "Having a Global Identity Crisis," Collections & Credit Risk, Aug. 2001, vol. vol. 6, No. 8, pp. 6.

Wesabe.com http://www.wesabe.com/, as retrieved on Sep. 17, 2008.

Yahoo! Search, "People Search," http://people.yahoo/com printed Nov. 16, 2010 in 1 page.

Yodlee | Money Center, https://yodleemoneycenter.com/ printed Feb. 5, 2014 in 2 pages.

You Need a Budget, http://www.youneedabudget.com/features printed Feb. 5, 2014 in 3 pages.

U.S. Appl. No. 13/797,278, filed Mar. 12, 2013, Circular Rotational Interface for Display of Consumer Credit Information.

U.S. Appl. No. 14/226,499 Issued 9,058,627, Circular Rotational Interface for Display of Consumer Credit Information, Mar. 26, 2014.

U.S. Appl. No. 13/797,011, filed Mar. 12, 2013, Presentation of Credit Score Factors.

U.S. Appl. No. 13/802,565, filed Mar. 13, 2013, Analysis of Credit Scores for Groups of Consumers.

U.S. Appl. No. 13/804,460, filed Mar. 14, 2013, Credit Score Goals and Alerts Systems and Methods.

U.S. Appl. No. 14/092,647, filed Nov. 27, 2013, Embedded Keypad.

U.S. Appl. No. 13/826,118 Issued 8,930,263, Credit Data Analysis, Mar. 14, 2013.

U.S. Appl. No. 14/589,330, filed Jan. 5, 2015, Credit Data Analysis.

\* cited by examiner

Accounts 12

Experian Report Updated 10.11.2012

90 percent of the credit score calculation is based on how you manage your different accounts. Accounts include credit cards, retail credit cards, real estate loans, installment loans, and collection accounts.

Sort

Chase Manhattan — Account Status — XXXX-XXXX-XXXX-3792 — Open
- Account Name: Credit Card 1
- Account #: 3792
- Payment Status: Complete
- Account Type: Credit Cards
- Balance: 7,6553

Wells Fargo — Account Status — XXXX-XXXX-5690 — Open
- Account Name: Mortgage
- Account #: 5690
- Payment Status: Complete
- Account Type: Real Estate Loans
- Balance: 326,411

Charles Schwab — Account Status — XXXX-XXXX-XXXX-5653 — Open
- Account Name: Credit Card 2
- Account #: 5653
- Payment Status: Complete
- Account Type: Credit Cards
- Balance: 6,456

Macy's Card — Account Status — XXXX-7876 — Open
- Account Name: Charge Card 1
- Account #: 7876
- Payment Status: Complete
- Account Type: Retail
- Balance: 75

FIG. 9

CIRCULAR ROTATIONAL INTERFACE FOR DISPLAY OF CONSUMER CREDIT INFORMATION

CROSS-REFERENCE TO RELATED APPLICATIONS

This application claims priority from provisional U.S. Pat. App. No. 61/732,244, filed on Nov. 30, 2012, which is hereby incorporated by reference in its entirety.

This application is related to, but does not claim priority from, U.S. patent application Ser. No. 10/452,155, filed May 30, 2003, now U.S. Pat. No. 7,610,229; U.S. patent application Ser. No. 12/606,060, filed Oct. 26, 2009, now U.S. Pat. No. 8,015,107; U.S. patent application Ser. No. 11/150,480, filed Jun. 10, 2005, now U.S. Pat. No. 7,593,891; U.S. patent application Ser. No. 12/563,779, filed Sep. 21, 2009, now U.S. Pat. No. 7,925,582; U.S. patent application Ser. No. 13/326,803, filed Dec. 15, 2011, and U.S. Prov. Pat. App. No. 60/384,650, filed May 30, 2002. The disclosures of the above-listed applications are all hereby incorporated by reference as if set forth herein in their entireties.

BACKGROUND

This disclosure relates to the field of consumer credit information and particularly to the presentation of credit score and credit report information.

The credit report and credit score are an important indicator of a consumer's financial health. Consequently, monitoring their credit reports and having a high credit score is important to consumers for many reasons. A high credit score may qualify a consumer for various financial programs and/or allow a consumer to receive favorable rates is such programs, such as loan applications, rental applications, real estate mortgages, and so on. The credit report may allow a user to view the underlying data affecting their credit score. Thus, many consumers have a substantial interest in finding ways to improve their credit scores and understand their credit reports.

There is much information available to consumers as to how to improve credit scores. For example, sources provide advice to consumers to pay off loans, to establish certain numbers of credit accounts, to establish new loans, to raise or lower credit card limits, and so on. However, this advice is generic to all consumers and does not provide information specific to a particular consumer's situation. The question for many consumers then is "How is my particular credit data affecting my credit score?"

To determine effective actions to take, it is often necessary to analyze a consumer's underlying credit information. However, paper credit reports are often confusing to consumers, and do not explain the effects of particular pieces of data contained within the credit report. Furthermore, consumers often do not know how their credit activities affect their credit score or how their credit score is calculated. This translates into consumers struggling to use and analyze their credit information in meaningful ways, or develop effective strategies to raise their credit score.

SUMMARY

Thus, it would be advantageous for consumers to be able to quickly view and understand how credit information affects their credit score. In particular, it would be advantageous for consumers to be able to visualize their particular credit information and understand how it is affecting their current credit score. It would also be advantageous for consumers to visualize the impact of specific credit data upon their credit score, either individually, or by category.

Consumers are interacting more every day with mobile devices, such as smart phones, tablets, and the like. However, information that consumers traditionally view in the form of printed materials don't optimize interaction capabilities of such mobile devices. Discussed herein are systems and methods for generating user interfaces that display credit information of consumers in manners that are specifically tailored for optimal use on mobile devices, such as user interfaces that optimize the user's ability to interface with credit data and to explore such credit data. In particular, the user interfaces described herein are dynamically created using credit data specific to a particular consumer In an embodiment, a mobile application can display and receive input from various user interfaces, including a circular pie chart representing input categories to a credit score calculation. The circular pie chart interface allows a user to rotate the pie chart relative to a pointer indicator so that when the indicator points to a portion of the pie chart associated with an input category, summary information may be displayed about how that input category impacts a credit score.

One embodiment may be a computer-readable medium comprising instructions configured to cause one or more computer processors to perform operations. The operations may include, among others, receiving credit score user interface data. The data may comprise a consumer's credit score based on a credit score algorithm and/or a consumer's summary credit information associated with respective categories of credit information used in calculation of the consumer's credit score. The instructions may also cause a processor to generate a user interface configured for display on a touch sensitive computing device, where the user interface comprises (1) a plurality of sections of a circular visual computer interface, wherein each section of the plurality of sections is associated with a category of credit information and each section of the plurality of sections is sized according to weight of the associated category's impact on the consumer's credit score and (2) a visual section indicator that indicates one of the plurality of sections as selected within the circular visual computer interface. The instructions may also cause a processor to access the credit summary information associated with a selected category of credit information. The user interface may be configured to depict the circular visual computer interface rotating in response to a dragged touch input on the displayed circular visual computer interface. Additionally, the rotation may cause the visual section indicator to indicate a particular section as selected within the circular visual computer interface, and display a portion of the consumer's credit summary information for the category associated with the particular section of the circular visual computer interface that is indicated as selected by the visual section indicator.

Some embodiments may comprise a computerized method that may be performed by a computer system. The computer system (comprising one or more computing devices) may receive a credit report, credit score, and credit summary information regarding a specific consumer, where the credit report and credit score have been generated by a credit bureau. The computer system may store the consumer's credit report, credit score and credit summary information in memory. The computer system may generate a spin-wheel user interface, the spin-wheel user interface comprising a plurality of spin-wheel user interface sections associated with a credit category. The spin-wheel user interface sections may be sized proportional to the credit score impact of each section's associated credit category. The computer system may access at least a first portion of the consumer's credit summary information in computer memory to display first credit category data specific to the consumer associated with a first selected spin-wheel user interface section, the first selected spin-wheel user interface section being displayed as selected using a visual selection indicator. Additionally, the computer system may receive a touch input from a user via a touch screen interface. The computer system may rotate the spin-wheel user interface according to the received touch screen interface input until a second selected spin-wheel user interface section is displayed as selected by the visual selection indicator. The computer system may access at least a second portion of the consumer's credit summary information in computer memory to display second credit category data specific to the consumer associated with the second selected spin-wheel user interface section, and display the second credit category data associated with the second selected spin-wheel user interface section.

Another embodiment may be a mobile computing device comprising at least a data store configured to store a consumer's credit report and summary credit information, a touch screen display configured to receive touch screen input; one or more processors; and a user interface module executable on the one or more processors. The user interface module may be configured to at least receive credit information specific to a consumer comprising at least a portion of the consumer's credit report and summary credit information, store the credit information in the data store, display a visual circular rotational user interface comprising a plurality of visual credit category sections, the visual credit category sections sized proportionate to a credit category's impact on a credit score associated with the consumer, display a visual credit category section indicator configured to indicate a selected visual credit category section, access a first portion of the credit information specific to the consumer in the data store, wherein the first portion of the credit information corresponds to data associated with the selected visual credit category section, display the first portion of the credit information specific to the consumer, receive a touch screen input over an area corresponding to the visual circular rotational user interface, rotate the visual circular rotational user interface relative to a direction indicated by the touch screen input, access a second portion of the credit information specific to the consumer in the data store, wherein the second portion of the credit information corresponds to data associated with a second selected visual credit category section, and display the second portion of the credit information specific to the consumer.

BRIEF DESCRIPTION OF THE DRAWINGS

FIG. 9 is a sample credit report user interface for analyzing credit report accounts, as used in an embodiment.

DETAILED DESCRIPTION

Overview

Figure 4:
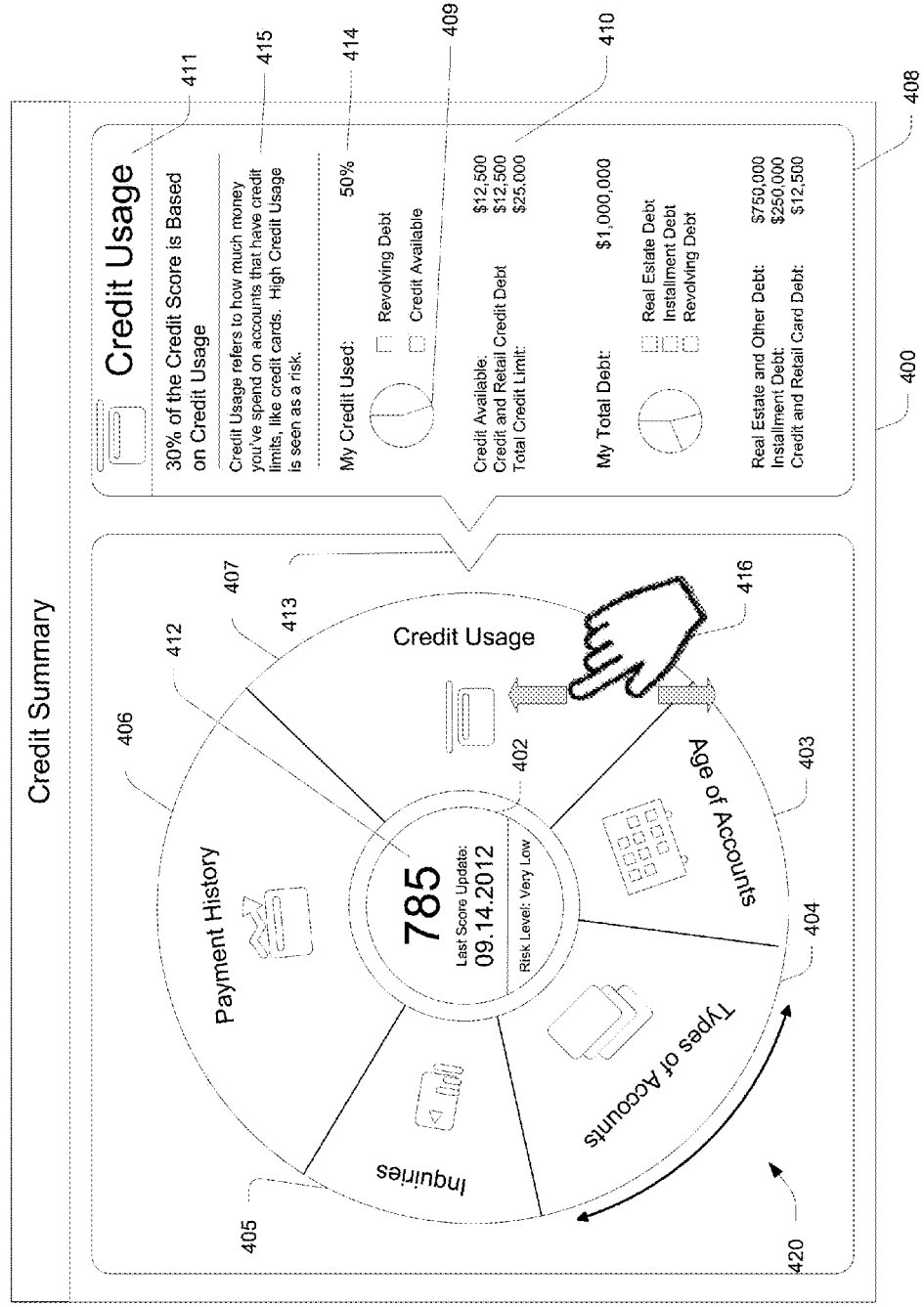
FIG. 4 is a sample rotational user interface and related user interfaces for analyzing credit report data, as used in an embodiment.

This disclosure illustrates credit summary user interface that includes a "spin-wheel" user interface and a credit category user interface, as used in some embodiments, to analyze and visualize credit data for a specific consumer. The spin-wheel user interface, (also called a visual circular user interface or a circular rotational user interface, or any combination thereof) both displays credit information about a specific consumer and allows for user input to control the display of additional credit information about the consumer either in the spin-wheel user interface and/or the credit category user interface. In one embodiment, the spin-wheel includes discrete pie chart sections of a circular whole. Each pie chart section of the spin-wheel is associated with a credit data input category that is used to calculate a credit score according to a credit score algorithm. For example, sections may include a credit usage, payment history, age of accounts, types of accounts, and credit inquiries. Each pie chart section of the spin-wheel may be sized according to the weight of its corresponding category. For example, FIG. 4 illustrates one embodiment where 30% of a credit score is determined on credit usage. Therefore, the corresponding section 407 of the pie chart is sized so it covers 30% of the spin-wheel pie chart region. In some embodiments, the center of the spin-wheel user interface may display credit information such as a consumer's credit score, when the credit score was last updated, the corresponding risk level of the consumer, and/or other data, based on a consumer's credit data transferred to the user device. Depending on the embodiment, the quantity and sizes of the various sections may vary from consumer to consumer, between geographic regions, or otherwise to indicate relative proportions of that certain types of data have towards a particular consumer's credit score.

In some embodiments, a user device displaying such an interface, such as computing device 162, receives credit score data or information to populate the spin-wheel user interface from a credit bureau or intermediary system such as credit report system 100, including a consumer's credit score. The credit data may be separated, at least in part, into categories, such as the five categories discussed above. The received credit data may also include summary credit information associated with each category of input credit information, such as summary credit data attributes, that may be displayed in a related credit summary data window.

FIG. 4, discussed further below, illustrates an example credit summary user interface 400 including a spin-wheel user interface 420 (or simply "spin-wheel" 420) and a credit category user interface 408. In some embodiments, the credit summary user interface 400 may also comprise a visual section indicator 413 and a credit category user interface 408. The section indicator 413 indicates a currently selected section of the spin-wheel by pointing to a section on the spin-wheel. The credit category user interface 408 displays credit information specific to the consumer about a currently selected credit category. For example, because the section indicator 413 in FIG. 4 is pointing to the credit usage section 407 of the spin-wheel, credit usage information is displayed in the credit category user interface 408. Thus, the consumer's credit information, such as the consumer having used 50% of his available credit, is displayed in the summary window.

The spin-wheel 420 can be rotated to alter the spin-wheel section selected by the section indicator 413. In some embodiments, a user may use a touch screen on a mobile device, such as an iPad, iPhone or Android device, to touch the screen to alter the rotational position of the spin-wheel. For example, the spin-wheel may rotate when a touch is registered within an unselected section of the spin-wheel. In such an embodiment, the spin-wheel may rotate so that the touched section is now selected by the section indicator 413, resulting in altering the credit category user interface 408 to contain information about the category associated with the newly selected section.

In some embodiments, a user may touch and remain touching with the spin-wheel 420, and drag their touch across the spin-wheel in a direction consistent with rotating the spin-wheel. In such an embodiment, the spin-wheel 420 may rotate proportionately with the touch movement. Because of the rotation of the spin-wheel 420, a new section may be indicated by the selection indicator 413, and thus the credit category user interface 408 may be updated according to the newly selection section as described above.

High Level Data Flow

Figure 1:
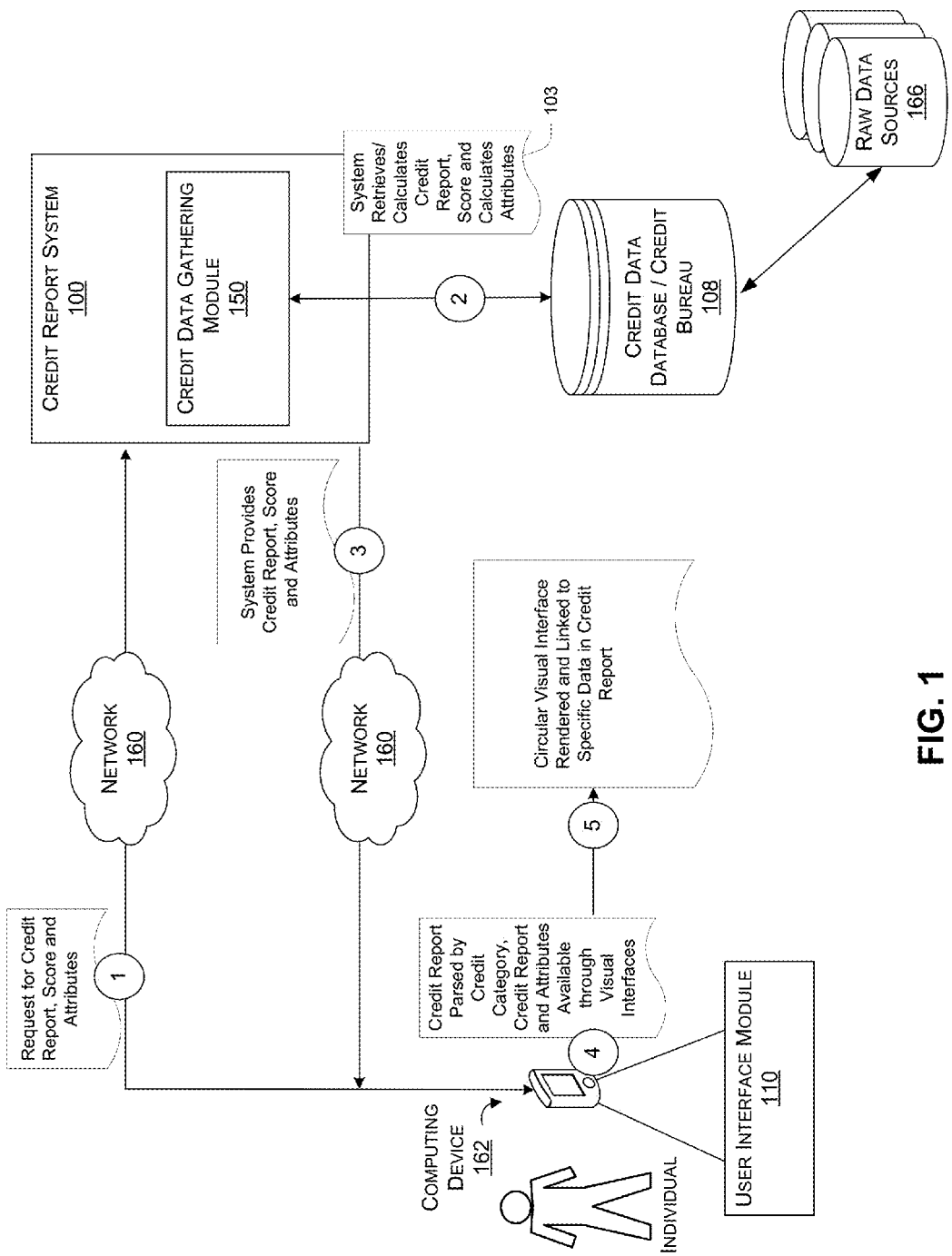
FIG. 1 is a flow diagram showing information exchange between a mobile computing device of a user and a credit report system that generates a credit score visualization of the user for display on the user's mobile computing device, as used in an embodiment.

FIG. 1 is a block and flow diagram of an embodiment of a credit score and report visualization computing system, in conjunction with related components. The entire visualization system may be a single computing device or a plurality of computing devices connected by a network or distributed computing system.

In an embodiment, various software modules are included in the credit score and report visualization system, which may be stored on the system itself, or on computer readable storage media separate from the system and in communication with the system via a network or other appropriate means. The credit score visualization system may include a credit data gathering module 150, which performs various tasks of gathering data used by the credit report visualization system. Such data may include, for example, credit data 103 retrieved from credit data database 108. Such a database 108 may comprise one or more credit bureaus and their databases, which usually receive information from raw data sources 166, such as banks and creditors.

The credit data may be retrieved via a network 160, via a dedicated communication channel, or by other means. In an embodiment, credit bureau 108 transmits credit data to the credit score visualization system 100 via a secured communication channel to ensure the privacy and security of the credit data.

In an embodiment, credit data is gathered on demand as required by the credit score visualization system. In another embodiment, credit data 103 is gathered on a periodic basis independent of requests for information to the credit score visualization system. In another embodiment, credit data is stored on the credit score visualization system (for example, in client computing device 162 or credit data gathering module 150), in which case, retrieval of credit data from a credit bureau may not be necessary. The credit data may include a complete credit report about a consumer, summary data, such as credit attributes (also referred to as credit variables) that are calculated using various modules, such as Experian's STAGG (standard aggregation variables) attributes, and/or credit data inputs to calculate a complete or partial credit score. Each credit data input may be associated with a particular category of credit inputs, for example credit usage, payment history, age of accounts, types of accounts, and credit inquiries. In some embodiments, credit data gathering module 150 may calculate the Summary/STAGG attributes or perform other modifications on the credit report or other credit data gathered.

Data gathering module 150 may also gather information about how a credit score is calculated. This may include algorithms, formulas, executable code, statistical variables, and the like. This information may be used to visualize the significance of each type of data in calculating a credit score. In an embodiment, the models and/or algorithms are retrieved from credit data database 108 on an on-demand basis as needed by the credit score visualization system. In another embodiment, the models and/or algorithms are retrieved on a periodic basis. In another embodiment, the credit score visualization system internally stores the models and/or algorithms (for example, stored on the client computing device 162).

In an embodiment, the credit score visualization system further includes user interface module 110, which may include executable instructions for constructing user interfaces or otherwise interacting with end users. User interface module 110 may include portions that are executed by the credit report system 100 and/or by the computing device 162. Thus, discussion herein of operations performed by the user interface module 110 may be performed entirely by the credit report system 100, entirely by the computing device 162, or some portions may be performed by the credit report system 100 while other portions are performed by the computing device 162. Furthermore, other computing systems may also perform all or some of the processes discussed with reference to the user interface module 110.

In one embodiment, the user interface module 110 may access data from credit data gathering module 150 or credit data database/credit bureau 108, and use that data to construct user interfaces that assist the user in visualizing a credit score and the underlying data used to construct a credit score. Such visualization may be presented to the end user and are designed to be easily manipulated and/or understood by the user. In an embodiment, the user interfaces transmitted by user interface module 110 are interactive. Various embodiments of the user interfaces that may be provided by user interface module 110, including a rotational circular visual interface (also referred to as a "spin-wheel"), are shown and described throughout this specification. Variations on such interfaces and other possible interfaces will be known to those of skill in the art.

User interface module 110 may be configured to construct user interfaces of various types. In an embodiment, user interface module 110 constructs web pages to be displayed in a web browser or computer/mobile application. The web pages may, in an embodiment, be specific to a type of device, such as a mobile device or a desktop web browser, to maximize usability for the particular device. In an embodiment, user interface module 110 may also interact with a client-side application, such as a mobile phone application (an "app") or a standalone desktop application, and provide data to the application as necessary to display underlying credit score information.

Client computing device 162, which may comprise software and/or hardware that implements the user interface module 110, may be an end user computing device that comprises one or more processors able to execute programmatic instructions. Examples of such a computing device 162 are a desktop computer workstation, a smart phone such as the apple iPhone, a computer laptop, a tablet PC such as the iPad, a video game console, or any other device of a similar nature. In some embodiments, the client computing device 162 may comprise a touch screen that allows a user to communicate input to the device using their finger(s) or a stylus on a display screen. The computing device 162 (or any of the computing systems described herein, such as credit report system 100), as described in detail under FIG. 10 may comprise storage systems such as a hard drive or memory, or comprise any other non-transitory data storage medium. The storage systems may be configured to store executable instructions that may be executed by one or more processors to perform computerized operations on the client computing device, accept data input from a user (e.g. on the touch screen), and/or provide output to a user using the display. These executable instructions may be transmitted to another device for execution or processing by the device to implement the systems and methods described herein.

The computing device 162 may be connected to the credit report system 100, including credit data gathering module 150 or credit data database/credit bureau 108 via a network 160. The client device may be connected to the network 160, which may include any combination of networks, such as local area, wide area, Internet, etc., by way of a wired network, such as an ethernet LAN or cable modem, or via a wireless method, such as through an 802.11 access point or via a cell phone network. The network 160 allows computing devices to send (i.e. transmit) and receive electronic transmissions.

The computing device 162 may also comprise one or more client program applications, such as a mobile "app" (e.g. iPhone or Android app) that may be used to visualize data, and initiate the sending and receiving of messages in the credit score visualization system. This app may be distributed (e.g. downloaded) over the network to the client computing device directly from a credit bureau 108, from the credit report system 100, credit data gathering module 150, or from various third parties such as an apple iTunes repository. In some embodiments, the application may comprise a set of visual interfaces that may comprise templates to display a consumer's credit data information from a credit report or associated attributes. In some embodiments, as described above, visual user interfaces may be downloaded from another server or service, such as the credit report system 100. This may comprise downloading web page or other HTTP/HTTPS data from a web server and rendering it through the "app". In some embodiments, no special "app" need be downloaded and the entire interface may be transmitted from a remote Internet server to computing device 162, such as transmission from a web server that is a part of the credit report system 100 to an iPad, and rendered within the iPad's browser.

FIG. 1 also illustrates an exemplary process for accessing credit data of a particular user, rendering the credit data within visual circular user interfaces, and linking that credit data to specific information in the credit data. Depending on the embodiment, the process illustrated by interactions 1-5 of FIG. 1 may include fewer or additional interactions and/or the interactions may be performed in an order different than is illustrated.

Beginning with interaction (1), the computing device 162 may transmit to credit report system 100 a request for a credit report and/or credit attributes, such as a credit summary user interface that includes a spin-wheel user interface and a credit category user interface, which may be generated based on underlying credit data. Such underlying credit data may include, but is not limited to, information about credit or debt accounts (such as the amount of available credit in accounts associated with a consumer, the age of open credit accounts, the types of accounts, the payment history on accounts, and past inquiries into credit reports or credit score).

In some embodiments, such a request may be accompanied with an authentication or authorization request. For example, in some embodiments, access to credit data may be restricted based on user identification. An authentication scheme may comprise submitting a user name and password to the credit report system 100, or any other authentication mechanism known by those skilled in the art. The authentication request may have occurred prior to the request for data access, or during the request. In some embodiments, although a user may authenticate, only certain users will be authorized to receive credit report data. For example, the credit report system 100 may comprise memory storing a list of users or types of users that may gain access to their credit data, such as paying users. In some embodiments, no authentication is necessary and credit data may be freely accessed by all users. Such a request may also include a request for the algorithms or user interfaces that may be used by an "app" or browser to render and interact with the requested credit data.

In some embodiments, some functionality may be accessible by unauthenticated users, and other functionality only accessible to authenticated users. The authenticated and unauthenticated sections may have the same features, similar features, or different features. In an embodiment, the authenticated section offers additional features not available in the unauthenticated section. For example, credit data or credit-related information is used in the various systems and methods described herein. This information may be stored in member accounts or automatically retrieved based on member account data. In such an embodiment, the credit-related information may be automatically pre-populated, so that members need not enter that information, while unauthenticated users would enter their information manually.

In interaction (2) of FIG. 1, the credit report system 100 may retrieve a credit report (and/or other credit data or other financial data) and/or calculate attributes. In some embodiments, the credit data gathering module 150, upon receiving a request from the computing device 162, may retrieve a credit score, credit report, and/or STAGG attributes (or other custom required attributes) from its local storage and fulfill the access request without consulting a credit bureau. For example, the data gathering module may have previously received a credit report and credit score from a credit bureau for that user and would have the report cached in its local storage. In some embodiments, the credit report and score may be periodically retrieved for users from a credit bureau in order to have it locally on file. Alternatively, or in combination, the data gathering module 150 may retrieve in real time the credit report, credit score and/or summary credit attributes from the credit bureau/database 108.

The data gathering module 150 may also calculate any attributes required by the visual user interfaces implemented by the user interface module 110. For example, summary credit attributes are typically calculated by credit bureaus that summarize credit data. These summary credit attributes can be requested along with, or as an alternate to, a credit report. However, the data gathering module 150 may also compile the summary attributes based on the credit report, or calculate custom (e.g. non-STAGG) attributes based on the credit report. For example, one summary attribute may comprise a calculation of the amount of available credit for a consumer. Such an attribute may be calculated based upon summing up all of the un-used credit available in a consumer's accounts. This final figure may then be associated with the credit report and stored in the data gathering module for later transfer to a client computing device 162. These calculations may be performed on demand or periodically.

In addition to retrieving credit reports, scores, and attributes, the data gathering module 150 may, in some embodiments, retrieve algorithms and other user interfaces such as a circular rotational user interface for transfer to the client device. These may be stored locally on disk within the credit data gathering module 150, or retrieved from a credit database. For example, a specific credit score algorithm may be retrieved from a credit bureau 108 and/or known in advance by the credit data gathering module 150. Based on the formula, the credit data gathering module may alter or generate a credit summary user interface (and/or other user interface) to reflect the specific formula. For example, as shown in FIG. 4, "credit usage" data may make up 30% of a credit score. However, this figure could be a percentage that is instead calculated on demand based upon a formula information sent to the credit data gathering module 150.

After retrieving and or calculating the information, interaction (3) of FIG. 1 illustrates the credit report system 100 transmitting the credit report and attributes, via the network, to the computing device's 162 user interface module 110. This information may be transmitted using a text credit report format, an XML format, using web services APIs, or any other organized data structure or protocol for transferring the information between the credit report system 100 and the computing device 162. Alternatively, this information may be transmitted to the client computing device 162 as a part of a web page and accompanying web page user interfaces to be rendered with an app or a browser, such as software code configured to generate the various visual features of the credit summary user interface discuss herein. In this embodiment, the credit report system may act as a web page or web site configured to provide static, scriptable, or executable code and data that may be used to implement the entire invention, even with a client computing device 162 only capable of web browsing.

In interaction (4), the user interface module 110 may then store the received credit information, and parse the credit report and attributes for data required to render the user interface. This may include organizing in a data structure one or more received attributes and data contained within the credit report into credit data categories such as credit usage, age of accounts, types of accounts, payment history, and credit inquiries. Additionally, this may involve calculating any additional attributes or summarization data based on the credit report for use in displaying summary information about the credit report to a user. As noted above, depending on the embodiment certain features discussed with reference to the user interface module 110 may be performed by the credit report system 100. Thus, the above-noted organization and calculations may be performed partially or entirely by the credit report system 100 in certain embodiments.

Figure 3:
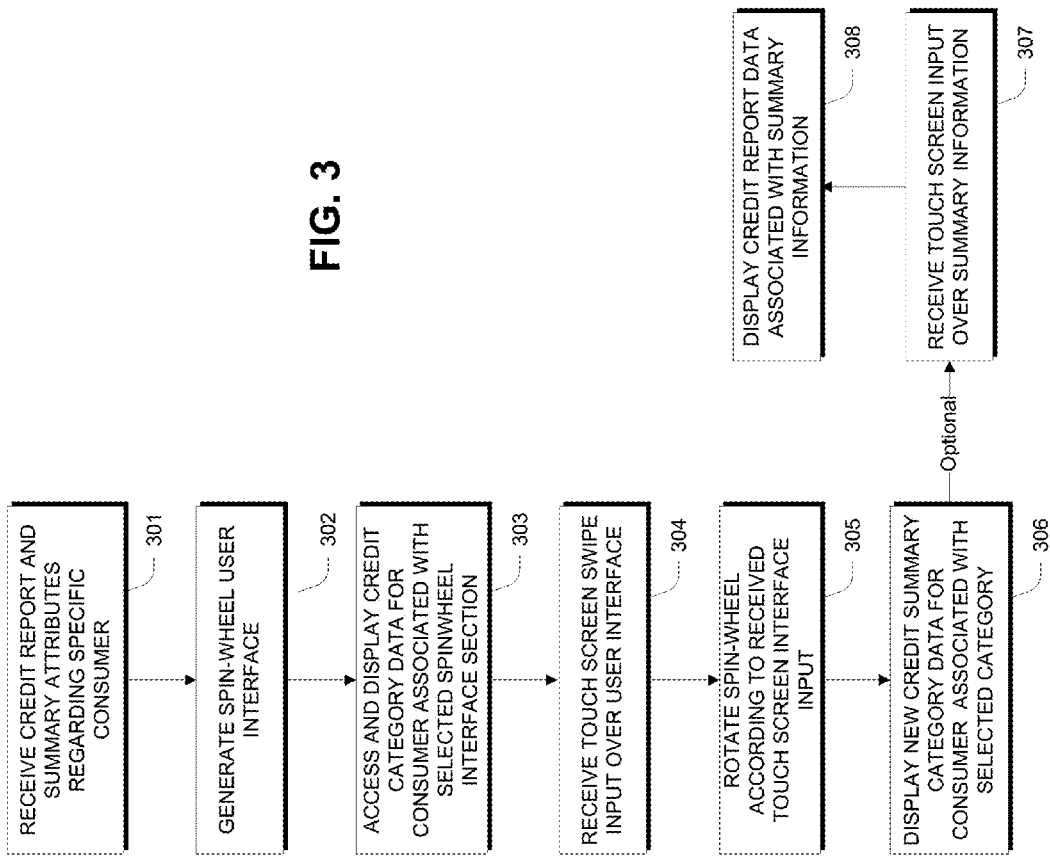
FIG. 3 is a flowchart illustrating processes taken to use a rotational circular user interface to display credit information, as used in an embodiment.

As described in more detail in FIG. 3 and its associated discussion, the user interface module 110 then displays a credit summary user interface including a spin-wheel user interface that allows a user to select a credit category using a touch screen, and displays detailed or summarized credit information pertinent to the selected category (e.g., in a credit category user interface). By way of example, FIGS. 4-8 illustrate circular rotational user interfaces that may be used in some embodiments.

Interaction (5) illustrates that, in some embodiments, the summarized data displayed for each category (e.g., in the credit category user interface) may be linkable to a displayable portion of a credit report on the computing device 162. For example, by touching a specific piece of data within the credit category user interface and/or the spin-wheel user interface, the user may be automatically directed to a portion of the user's credit report displaying detailed information regarding the clicked data. With reference to FIG. 4, for example, if "Total Credit Limit" 410 was touched in the credit usage user interface 411, the client device 162 and/or credit report system 100 may direct the user to a portion of their credit report listing all account information, including each individual credit limit for each account and/or other data related to the user's total credit limit. Advantageously, this allows a user to easily browse and visualize a high level overview of their credit data and drill down into their detailed credit report for further information.

Credit Reports and Credit Bureaus

The credit report system 100 may be separate from a credit bureau or credit data database 108. One of the purposes of the credit report system is to interface with the credit bureau or any database that has data that will eventually be rendered by computing device 162. The credit report system 100 may request and extract the appropriate credit data for a specific consumer based on a user using the computing device 162. This allows for a single point of contact for computing device 162 interaction. The credit report system 100 can then be configured to request from and receive data from credit bureaus or other credit databases.

Alternatively, the credit report system 100 may be executed by a credit bureau itself. In this case, the credit report system and the credit bureau functionality may be combined, with no need to transfer data over a wide area network between them. In some embodiments, the client computing device 162 may be configured to interact directly with a credit bureau over a network, to access a credit report and summary attributes. In this case, any custom attribute creation or processing needed must be performed by the computing device 162.

Figure 2:
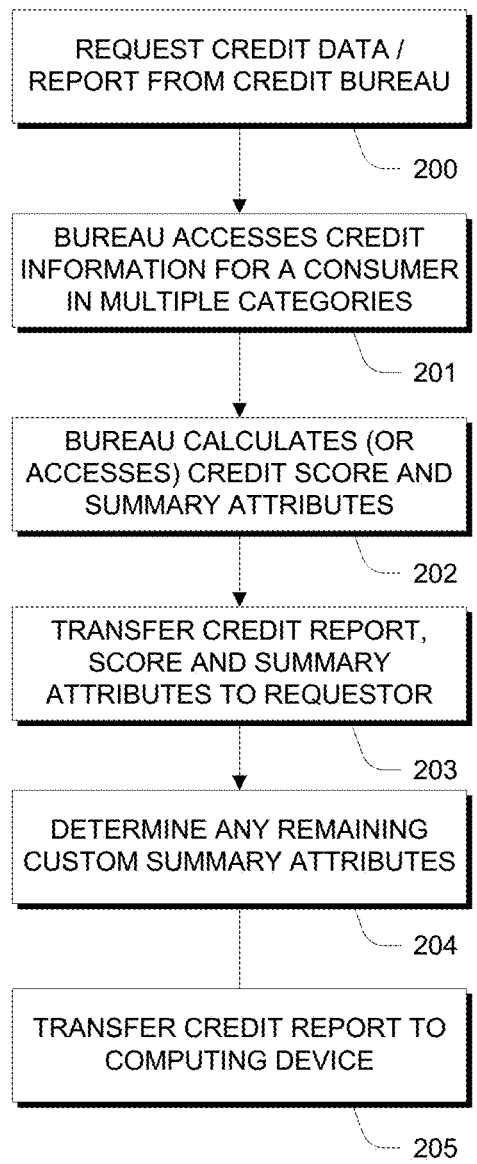
FIG. 2 is a flowchart illustrating processes taken to deliver credit information to a user's mobile computing device, as used in an embodiment.

Example Method of Obtaining and/or Generating Data for Credit Summary User Interface FIG. 2 is a flowchart illustrating one embodiment of a method of retrieving a credit report and/or attributes/summarized credit data and generating data that may be used to render a credit summary user interface, as well as possibly other user interfaces for display to the user. In various embodiments, fewer blocks or additional blocks may be included in the process, or various blocks may be performed in an order different from that shown in FIG. 2. In particular, the blocks in FIG. 2 may be performed by computing device 162, credit report system 100 or credit database/bureau 108 (or any combination thereof), depending on which computing device/software service has access to the required credit data.

As one skilled in the art would recognize, credit bureaus make their data available to consumers and businesses, usually (but not limited to) for the purpose of checking a consumer's credit history and credit score. A credit bureau's credit report may include, among other things, data concerning payment history (such as current accounts and late payments), credit usage and availability, the age of financial accounts, the types of financial accounts, and inquiries into credit reports or credit scores. This data may be collected from one or more raw data sources 166 (FIG. 1) which may comprise information from consumers' banks, mortgagors, lendors, creditors, services, utilities, public records, and other institutions where a consumer holds a financial account. The data may include a status of each account, such as when the last bill was paid, how late a recent payment is or how behind a consumer is on their account, a payment history, the available credit allowed in an account, the account balance, and when an account was opened and/or closed, among other credit information.

Beginning in block 200, the requestor, for example the credit report system's 100 credit data gathering module 150 (or in some embodiments, the computing device itself 162) issues a request to a credit bureau or other credit database for credit information about a consumer, such as a credit report, and associated attributes. The request may be issued by sending it over an electronic wide area network, such as the Internet. The credit bureau receives this request, and may, if necessary, charge and/or authenticate the requestor by methods known in the art.

Next, in block 201, the credit bureau may either retrieve cached, precalculated, and/or precompiled credit data, report, score, and/or attributes about the consumer, or create a report on the fly by accessing specific credit information for a consumer. For example, based on information periodically collected by the credit bureau 108 from raw data 166 sources disclosed above, the credit bureau 108 may compile credit information into a credit report, wherein the data may be organized by credit categories such as credit usage, payment history, age of accounts, types of accounts, and credit inquiries, among others.

Moving to block 202, the credit bureau 108 may then use the collected credit information to calculate a credit score, based on a proprietary or publicly-known formula, using credit data associated with various credit categories in a predetermined proportion, for example. The credit bureau may also calculate and/or create the attributes that are often associated with a credit report. These attributes may be summary variables that summarize data related to individual accounts. For example, one summary attribute may be a calculation of the total max credit for all credit card accounts.

In block 203, the credit report, the credit score, and/or the summary attributes may be transmitted back to the requestor, such as the credit report system 100, and may be stored within the requestor's data storage such as a hard drive. In block 204, any additional attributes to be used in generating the various user interfaces of the credit summary user interface (e.g., by the client device and/or the credit report system) may be calculated by the credit report system (or alternatively, these attributes may be calculated at the client computing device 162). Such a calculation is based on the information received by the requestor such as the credit score, credit report information (e.g. account trade lines, etc), and received attributes. These may be different summary attributes than the default summary attributes.

Next, in block 205, the credit report, credit score, and all required attributes may be transmitted to the computing device 162 if necessary, and stored within its data storage 162. In other embodiments, the actual credit data may not be transmitted to the computing device 162 and, rather, software code (e.g., HTML, Java, Perl, Ruby, Python, etc.) may be transmitted to the computing device 162. For example, code that is usable by the computing device 162 to render the credit summary user interface may be transmitted, without transmitting a data structure that separately includes the actual credit data.

In some embodiments, the system distinguishes between the initial transmission of credit data required for user interfaces, and subsequent transmissions of user interface data so that it may transmit only portions that are necessary to update a spin-wheel user interface data for a new credit category. This may be done, for example, using an XMLHttpRequest (XHR) mechanism, a data push interface, or other communication protocols.

Example Method of Displaying and User Interactions with a Spin-Wheel User Interface FIG. 3 illustrates a method implemented by the user interface module 110 and other related software and hardware that allows this user interactivity. In various embodiments, fewer blocks or additional blocks may be included in the process, or various blocks may be performed in an order different from that shown in FIG. 3.

In block 301, the client device receives the information from either credit report system 100 or another credit database or credit bureau, as described in FIG. 2. This information may then be stored for convenient access within the device during a user application sessions, or across user sessions. The data may be stored in a data structure using any number of formats such as a relational database, XML data, HTML data, common separated values (CSV) data, or other formats.

Throughout the method described in FIG. 3, the credit report system 100 or credit bureau 108 may transmit user interface data or credit report data, such as summary attributes, to the computing device 162. The updated data may be used then by the client computer to update the displayed user interface so that the user may see the information. For example, a user may relaunch the application and upon relaunch, the user interface module 110 may perform an additional request to refresh its stored credit report, credit score and/or summary data for a consumer in order to display the most up to date information. In some embodiments, after a selection of a new spin-wheel section (described below), the user interface module 110 may query the credit report system or credit database/bureau 108 for credit report and summary information to be displayed for that category in real-time. This may be accomplished using asynchronous methods, by way of example, AJAX or web services, or any remote API.

Next, in block 302, a credit summary user interface may be generated for a particular category. A credit summary user interface, such as the ones shown in FIGS. 4-8, may comprise a spin-wheel 420 divided into credit data sections (e.g., sections 403-407), a section indicator 413, and a credit category user interface 408.

The sections of the spin-wheel 420 may be generated by dynamically rendering the circular user interface (for example, interface 420 from FIG. 4 including middle section 402, and category sections 403-407). For example, category sections may be associated with credit categories such as number of credit inquiries, credit usage, payment history, age of accounts, and types of accounts. To determine a credit score, a credit bureau may weigh the impact of each credit category according to a formula. The weights of this formula may be known by the user interface module, by storing the weights within the computing device's 162 memory. In some embodiments, these weights may have been transferred to the computing device, with the formula data originating at the credit bureau 108 or the credit report system 100. The weights of the credit score formula may then be used to appropriately size each category section of the spin-wheel 420. For example, if 30% weight in the credit score is for credit usage data, then the credit usage section 407 of the spin-wheel 420 may be sized as 30% of the spin-wheel 420.

The credit score formula weights used may depend on the geographic location of a user. For example, because of differences in culture, education, standard of living, available credit, housing values, or other macro economic factors, a credit bureau may use a different credit formula for a user who lives in Topeka, Kans., than a user who lives in Brooklyn, N.Y. This may include different weights for the credit score data categories in a credit score formula. The credit bureau 108 and/or the credit report system 100 may determine the appropriate location to use to determine the weights in a variety of ways, e.g., based on contact data of the consumer (e.g. primary house address of the specific consumer), or computing device 162 location based on GPS or IP address of the computing device. Based on the location, the appropriate weights may be selected by the credit bureau or credit report system 100 to send to the computing device 162. In some embodiments, the personal computing device 162 may select the appropriate formula weights to use, such as based on data received from the credit report system 100. For example, if the computing device 162 has a stored mapping of location to weights, then the computing device 162 may determine its location and the associated weights to use. These weights may then be used to dynamically scale the spin-wheel category sections and corresponding description text.

Alternatively, among other methods, the spin-wheel may be generated using pre-sized image templates. For example, if a credit score formula's category weightings are known, the sizes of the spin-wheel sections may be pre-sized according to the known weightings. In some embodiments, the user interface module may have multiple sets of image templates based on different formulas used by different credit bureaus, and the computing device 162 may select the appropriate templates using a mapping.

Center section 402 may also be generated by the user interface module 110. In some embodiments, the center section 402 of the spin-wheel interface 420 may display the consumer's credit score, the date the score was last updated, the risk level associated with the score, and/or other data associated with the consumer. User interface module 110 may access a mapping of risk levels (e.g. low, medium, high, etc) to various score levels. The score mapped risk level associated with the credit score may then be displayed. In some embodiments, the risk level may be colored based on the relative risk level of the specific consumer (e.g. red for high, orange for medium, green for low, blue for very low, etc.). In some embodiments, when the spin-wheel is rotated, the center section 402 such that the text remains upright.

Other portions of the spin-wheel user interface may then be generated by the user interface module, for example, the section indicator 413 and credit category user interface 408 may be displayed on the computing device's display screen (e.g. a touch screen).

Moving to block 303, the credit category user interface may be updated to include information associated with the particular data in the selected credit category (e.g., the credit category indicated by the section indicator 413). A number of credit report fields, summary attributes, and/or custom attributes, associated with a particular category, may be selected by a programmer, user, or administrator for display within the credit category user interface 408. For example, for the credit usage category, within credit category user interface 408, the attribute associated with total credit used 414 may be displayed. Likewise, values 410 of the attributes associated with credit available, total credit and retail credit debt and total credit limit may also be displayed. The credit information associated with the category may also allow for the dynamic display of pie charts based on the information associated with the category. For example, the relative amount of credit used may be displayed in a pie chart 409 according to its makeup of revolving debt and remaining credit available.

In addition to credit information and attributes derived from a credit report, information not stored within the credit report and associated with the credit category may also be displayed. For example, text used to describe each attribute may be stored in an image template for use with its associated credit category. Alternatively, the computer device 162 and/or credit report system 100 may store mappings of descriptions for credit categories or attributes and credit data associated with those credit categories or attributes. For example, the text displayed the "My Credit Used" and "Credit Available", etc., may be associated with attributes or data values received. Data associated with the credit category, and not a specific attribute, may also be displayed and associated within the window (such as category description text 415).

Such associations may be dynamic based on the received data from the credit report, or static. For example, description of a category may be considered static text, whereas attribute values derived from a consumer's credit report may be dynamic text. Dynamic text associations may be updated when new credit data is received by computing device 162. For example, variables or database entries, stored in memory or long term storage of the user interface module and/or computing device 162 and associated with credit categories, may be altered to reflect values of received credit data. These values may then be used for display when a specific category is selected.

Next, in block 304, the user interface module 110 may then receive input from a touch screen on the computing device 162, or any other user input device. For example, using a touch screen, a user may press and hold a section of the spin-wheel 420. For example, a user may touch and hold down their finger 416 on the spin-wheel as depicted in FIG. 4. The user may then move their touched finger vertically (and/or horizontally or diagonally) on the touch screen. By doing so, as described in block 305, the user interface module 110 may rotate the wheel in a direction that corresponds to the touched finger (e.g. a swipe). For example, if a user dragged their finger vertically up in FIG. 4, the user interface module 110 may initiate display of a counterclockwise rotation of the spin-wheel 420. If the user dragged their finger down in FIG. 4, the user interface module may initiate display of a clockwise rotation of the spin-wheel 420. The spin-wheel's exact movement need not match the finger movement exactly, but it may be desirable to rotate the spin-wheel in the same general direction as finger movement. In some embodiments, the spin-wheel may be rotated by tracking the finger on the touch screen in a rotational movement around the center section, instead of strictly vertical. The movement of the finger need only identify whether to rotate the wheel in a counterclockwise or clockwise fashion.

Once rotation of the spin-wheel 420 has ceased, the section indicator 413 will point to a particular section (and related category) within the spin-wheel 420. For example, in FIG. 4, if the spin-wheel was rotated counterclockwise by touch input, the section indicator may eventually point to the Age of Accounts section 403 instead of the Credit Usage section 407.

Figure 5:
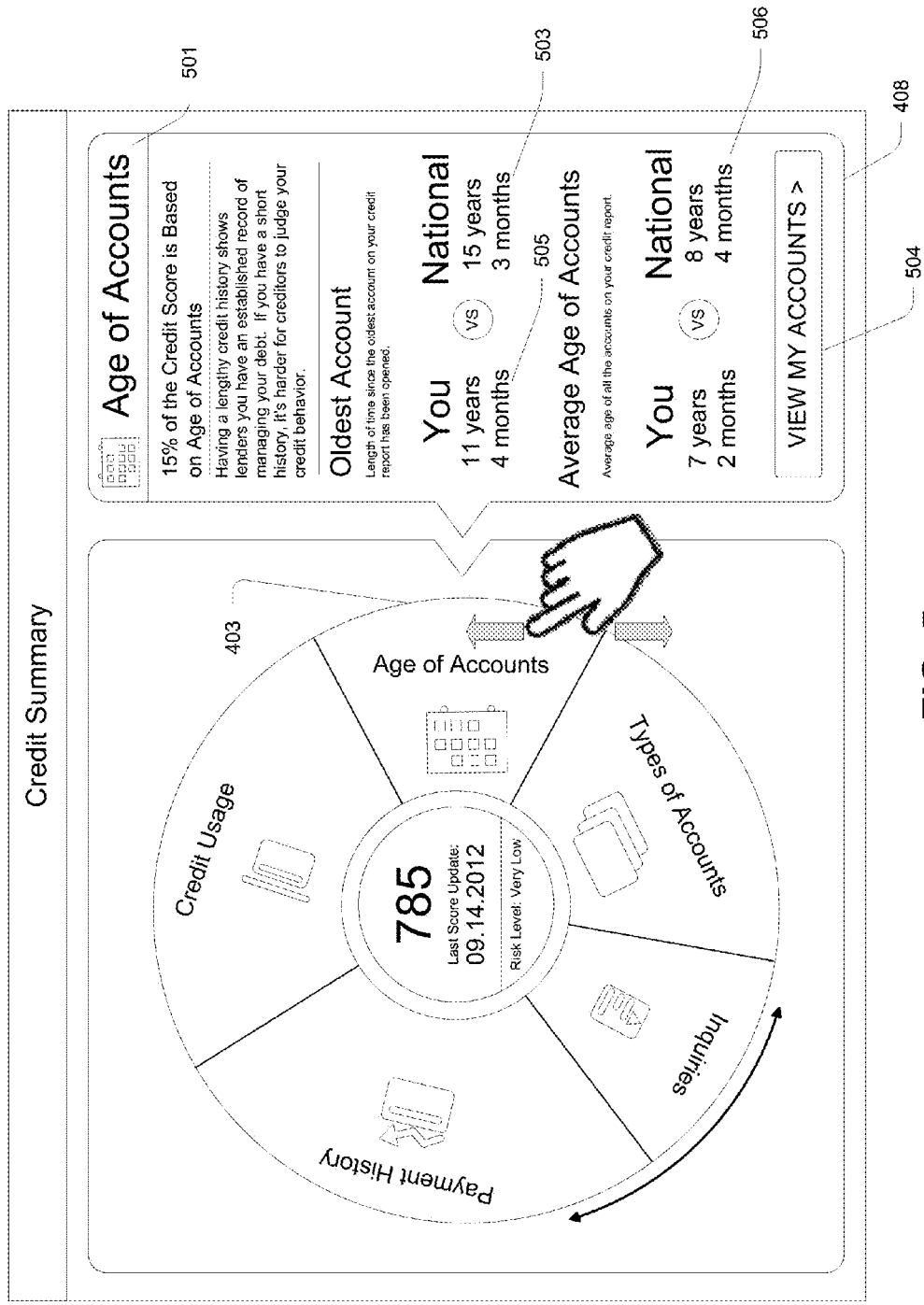
FIG. 5 is a sample rotational user interface and related user interfaces for analyzing credit report data, as used in an embodiment.

Next, in block 306, when the section indicator 413 points to a new section (or when the user's touch is removed and the section indicator points to a new section), the credit category user interface 408 may be updated with information associated with the corresponding credit category. Thus, if the section indicator 413 points to the Age of Accounts section 403, the credit category user interface 408 may be updated with credit data associated with Age of Accounts of the particular user. FIG. 5 illustrates one example of credit data associated with Age of Accounts that may be displayed in the credit category user interface 408. This may involve displaying the age of the user's oldest account and/or an average age of the user's accounts. FIGS. 4-8 show various examples of credit information categories that may be selected, thus causing the credit category user interface to be updated with credit data of the particular user associated with the different credit categories.

In some embodiments, the information displayed in the credit category user interface may be interactive and linked to more detailed consumer credit information contained within a credit report. For example, in block 307 of FIG. 3 some embodiments may receive a touch screen input over the summary information. By way of example, FIG. 4 displays a credit category user interface 408 containing information about credit usage. This window may include summary information about credit usage in various types of debt, such as real estate and other debt, installment debt, and credit and retail card debt. This information may be calculated by using summary attributes, or custom credit summary attributes calculated by the personal computing device 162 or the credit report system 100.

In some embodiments, the user interface module 110 may be configured to associate specific detailed information in a credit report with the summary information displayed in the credit category user interface. Using the example above, the credit and retail card debt and its associated displayed value may be linked to data in the credit report. By way of illustration, when a user touches (or clicks) a location on or near the summary description text or value for "credit and retail card debt," the user interface module may launch an associated user interface (such as the one illustrated in FIG. 9), where the user may now be shown associated detailed account information.

In block 307, if a user touches the specific category of information or corresponding value, then information about that attribute or category may be displayed in block 308. For example, once a user touches "credit and retail card debt," that user may be shown the their Chase Manhattan 900, Charles Schwab 901, and Macy's 902 (FIG. 9) open retail and credit card accounts. Information about the accounts status may be displayed, including their credit balances, whether those accounts are current, the type of account, and include a clickable or touchable link (e.g. 903). If the link is followed, the user interface module 110 may display trade line account information for the specific account, such as specific transactions for a credit card.

The location at which specific credit information about a consumer is placed within the user interfaces associated with the visual circular rotational interface may also vary in various embodiments. For example, additional credit information and/or summary credit data may be displayed within a selected slice/section. In another embodiment, additional credit information and/or summary credit data may be shown in an internal window within the user's mobile application or web browser. In other embodiments, additional credit information and/or summary credit data may be shown in a separate pop-up window. In another embodiment, additional credit information and/or summary credit data may be shown on a separate web page, or in a separate application.

Example User Interfaces

FIGS. 4-8 illustrate a sample credit summary user interface as user interfaces with the various user interface controls within the credit summary user interface. In various embodiments, the user interfaces shown in FIGS. 4-8 may be presented as a web page, as a mobile application, as a stand-alone application, or by other communication means. In other embodiments, analogous interfaces may be presented using audio or other forms of communication. In an embodiment, the interface shown in FIGS. 4-8 are configured to be interactive and respond to various user interactions. Such user interactions may include clicks with a mouse, typing with a keyboard, touches and/or gestures on a touch screen, voice commands, and/or the like. As one skilled in the art would recognize, the systems and methods described herein are compatible with various types of input in addition to, or as a replacement for, the touch screen input described.

As described above, FIG. 4 illustrates a credit summary user interface 400 that includes a spin-wheel user interface 420 and a credit category user interface showing information related to a "Credit Usage" 411 category for a specific individual consumer (who in some embodiments may be the user of the client computing device 162 or another individual). Various summary attributes and other data related to the credit category for the individual consumer may be displayed when the credit usage section 407 of the spin-wheel 420 is selected (e.g., by rotating the spin-wheel 420 so the section indicator 413 points to the credit usage section 407. The credit category user interface 408 may display the approximate weight of a currently selected category in generation of the user's credit score, a general description of the category (including a description of how it impacts your score), summary data (e.g. credit attributes), any default summary attributes, and/or custom attributes. For example, in the embodiment of FIG. 4, credit usage information includes a total credit used out of available credit, an amount of which is revolving debt or available credit, an amount of credit and retail debt available, and a total credit limit in area 410, as well as a percentage of total credit used 414, among others. Alternatively, or in combination, this information may be dynamically rendered using a pictorial graph such as a pie chart 409. For example, in pie chart 409, it depicts revolving debt in one section of a pie chart out of the total credit available. Other credit information may also be displayed as it pertains to the specific consumer. For example, the amount of total debt, real estate debt, installment debt, credit and retail card debt, and revolving debt may be displayed.

In some embodiments, the "age of accounts" 501 may be a credit category that can be selected by the spin-wheel, as depicted in FIG. 5. Like the user interfaces illustrated in FIG. 4, the user interface module 110 may display the percentage weight of impact that data in the age of accounts category has on the consumer's credit score, and display a description of the age of accounts category (including a description of how it impacts your score). It may also display the oldest age of an account for a credit user, and display a comparison to the national average consumer's age of their oldest account. The data received in order to make that comparison may be compiled in a credit bureau 108 or the credit report system 100 and be transferred to and received by the computing device 162. Similarly, an average age of all accounts of a consumer may be displayed, with a similar comparison being performed 506. In addition, other user interface elements, such as the "view my accounts" button 504 may be displayed that link to other information in a credit report. In this case, the "view my accounts" button may be a user interface screen such as the one shown in FIG. 9 where all accounts for a consumer may be displayed.

Figure 6:
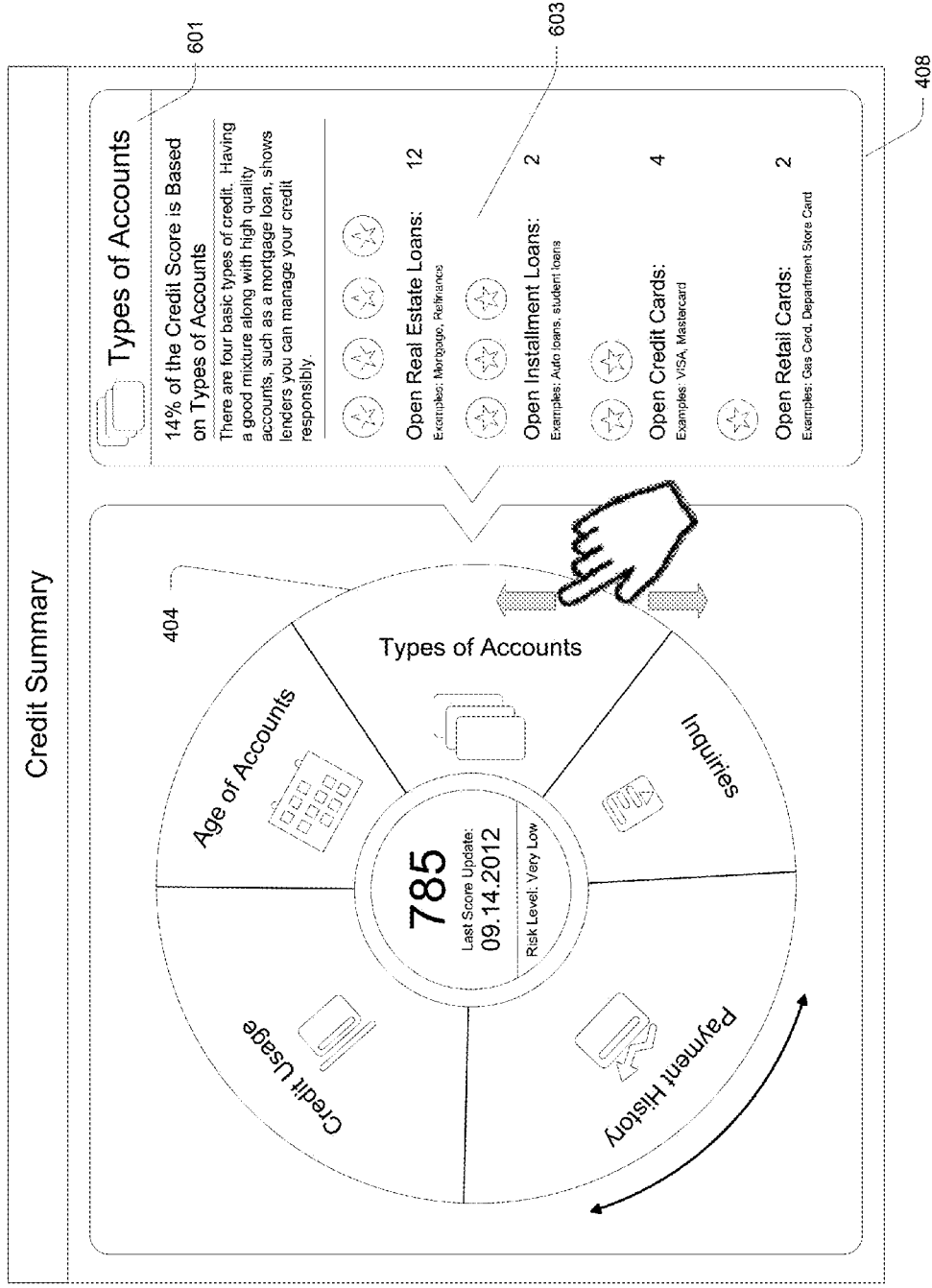
FIG. 6 is a sample rotational user interface and related user interfaces for analyzing credit report data, as used in an embodiment.

In some embodiments, the "types of accounts" 601 may be a credit category that can be selected by the spin-wheel, as depicted in FIG. 6. Like the user interfaces illustrated in FIG. 4, the user interface module 110 may display the percentage weight of impact that data in the types of accounts category has on the consumer's credit score, and display a description of the types of accounts category (including a description of how it impacts your score). Section 603 of the credit summary display window may contain an indicator of quantity and/or quality of various types of accounts, such as open real estate loans (mortgages, refinanced loans, etc.), open installment loans (auto loans, student loans, etc.), open credit cards (VISA, mastercard, etc.), and open retail cards (gas cards, department store cards, etc.). Such an indicator may be a color grading or other representation of high, medium high, medium, medium low, low quality, etc. Or, as displayed the quality grading may be represented in a series of symbols such as the shown stars, where more stars equals higher quality of accounts. The quality may be determined by accessing summary credit score attributes indicating the quality of accounts or analyzing the credit report. Such analysis may be performed by either the computing device 162, the credit report system 100, or the credit bureau 108. The results may then be transferred to the computing device 162 if necessary.

Figure 7:
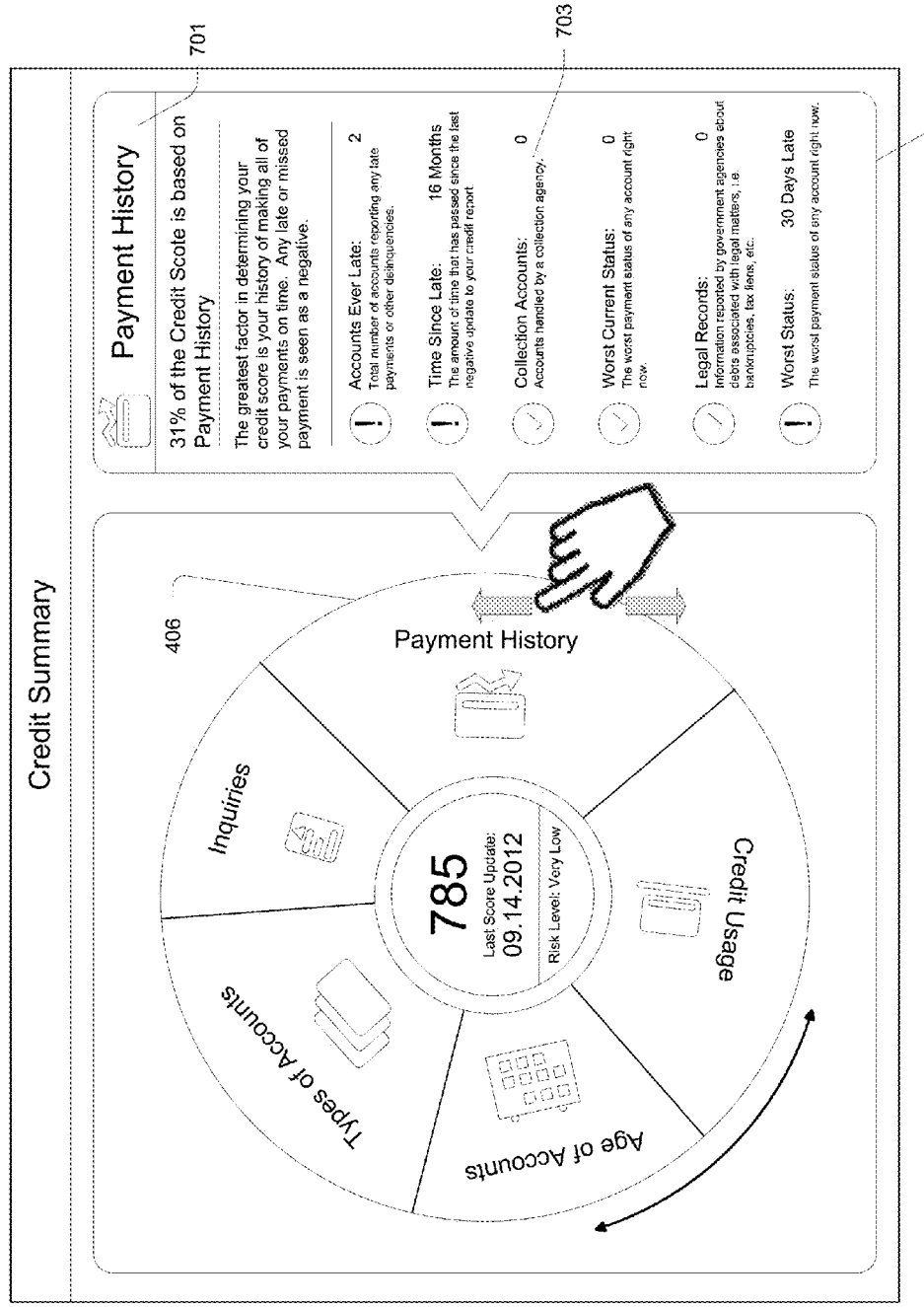
FIG. 7 is a sample rotational user interface and related user interfaces for analyzing credit report data, as used in an embodiment.

In some embodiments, the "payment history" 701 may be a credit category that can be selected by the spin-wheel, as depicted in FIG. 7. Like the user interfaces illustrated in FIG. 4, the user interface module 110 may display the percentage weight of impact that the payment history category may have on the consumer's credit score, and display a description of the payment history category (including a description of how it impacts your score). Information about specific summary attributes related to payment history, such as description text and a value, may be displayed in the credit category user interface 703. The display may include a short description of the summary attribute, a summary quantity related to the attribute for the specific consumer, a long description text of the attribute, and whether the attribute value has a positive or negative impact on credit score. Such attributes may include whether payments on accounts are ever late, the time since the last late payment, whether any accounts are out for collection, the worst current status, outstanding legal records concerning payment history, and the worst status ever of an account, among others not shown. Whether the value has a positive or negative value on credit score may be represented by an icon to represent status, such as a check mark for a positive impact (or lack of negative impact), and an exclamation point for a negative impact.

Figure 8:
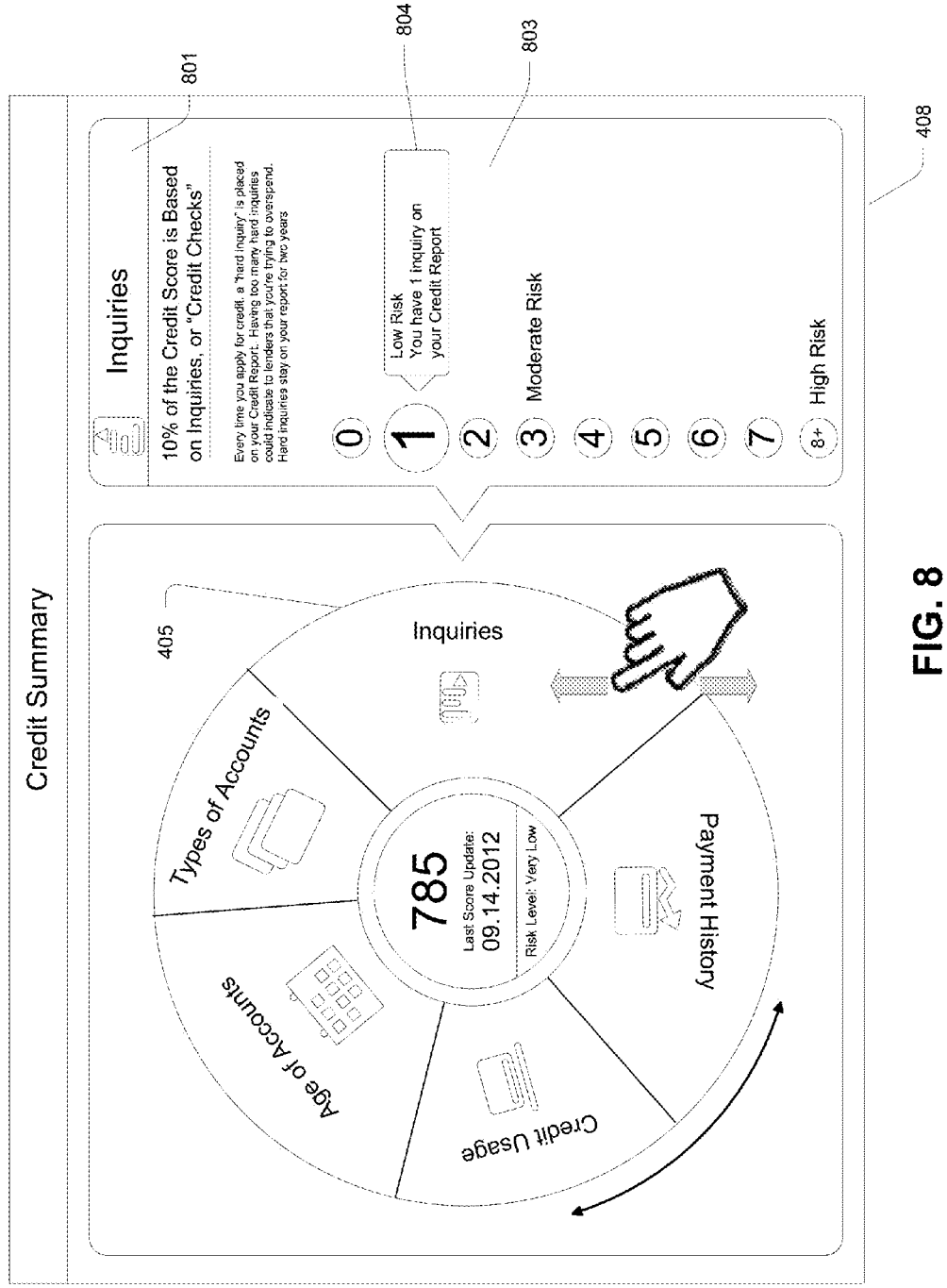
FIG. 8 is a sample rotational user interface and related user interfaces for analyzing credit report data, as used in an embodiment.

In some embodiments, the "credit inquiries" 801 may be a credit category that can be selected by the spin-wheel, as depicted in FIG. 8. Like the user interfaces illustrated in FIG. 4, the user interface module 110 may display the percentage weight of impact that the inquiries category may have on the consumer's credit score, and display a description of the inquiries category (including a description of how it impacts your score). The credit data summary window may indicate, using a visual indicator such as a sub window or icons, the amount of credit inquiries of a specific consumer's credit report. For example, in FIG. 8, the example consumer has only one inquiry on his or her credit report, as indicated by the sub window 804 and the number icon the sub window is pointed to. The number of credit inquiries may be correlated with an amount of credit risk in the user interface, such as "Low Risk" as displayed in sub window 804. The associated credit risk may be color coded. For example, the "1" inquiry indicator may be green to indicate low risk, with the colors gradually transitioning to a red icon for 8+, corresponding to high risk. The amount of risk corresponding to the indicator may be determined by the user interface module 110, the credit report system 100, or the credit bureau 108, and transferred to computing device 162 if necessary.

Each individual piece of information, both the description and/or the value displayed for all the summary window data, may be linked to specific credit data in a consumer's report that may be displayed, as described under FIG. 3.

In addition to comparison of national averages as shown in FIG. 5, the spin-wheel interface in general may also be used to display other credit information, such as a spin-wheel credit user interface that a user could use to browse the average "good score" consumer credit attributes/summary information, (e.g., a score master, see incorporated provisional). For example, in some embodiments, the center of the credit wheel may display an indicator that a consumer is or is not considered a score master. Additionally, it may display a potential score master's minimum, top, or average score, and/or risk associated with that score. The credit category user interface 408 may contain example information about a credit master. For example, in FIG. 4, where it lists 50% credit used 414, a score master's percentage of credit used could be displayed alongside the consumer's percentage of credit used so that a user can make an easy comparison and decide to lower or raise their available credit in the future. As another embodiment, an example or average score master's complete credit information may be displayed in the spin-wheel interface 420 instead of a consumer's information, and may display information about an average score master or example score master in the credit category user interface 408 when a particular section is selected.

In some embodiments, the spin-wheel sections and/or the center area may be altered visually to indicate strengths and/or weaknesses of a consumer's credit information. For example, the credit usage information in the credit category user interface 408 in FIG. 4 may be certain color, such as green, to indicate a credit score strength if the data within that category impacts the credit score positively. These colors may be a part of a continuum of colors where relative strengths and weaknesses can be displayed. Another category of the spin-wheel 420, for example payment history category 406 as shown in FIG. 7, may be red or any color associated with negativity if a consumer's payment history information negatively affects a consumer's credit score. Additionally, information within the credit category user interface 408 may be color coded to indicate to a user whether a certain input within a credit category affects a credit score positively or negatively, as depicted in FIG. 8 showing summaries about "collection accounts", "legal records, "accounts ever late", etc.

Example System Implementation and Architecture

Figure 10:
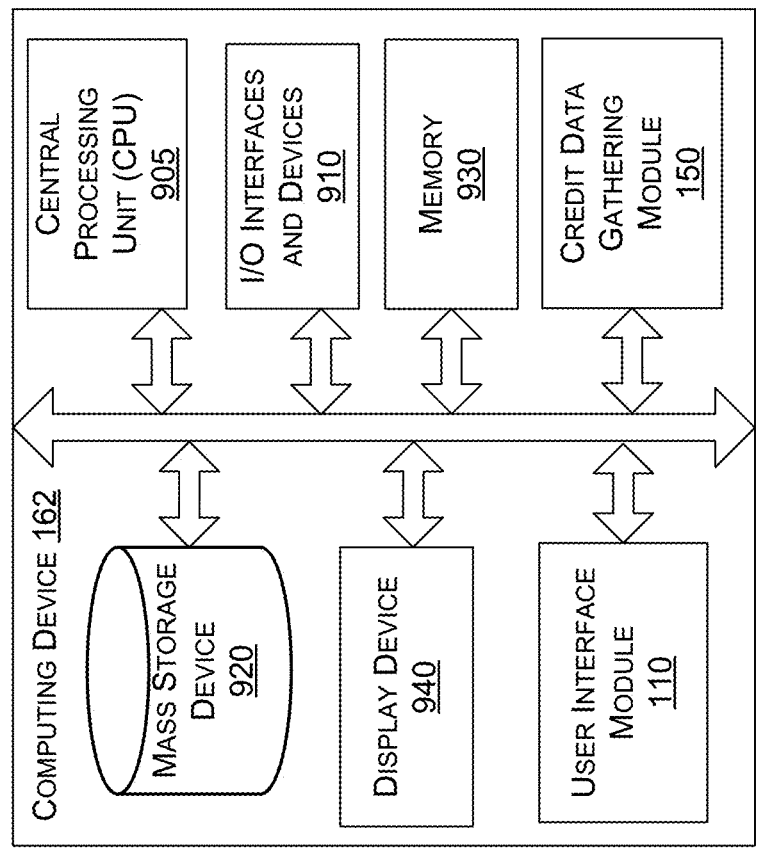
FIG. 10 is a sample block diagram representing hardware and/or software components of an example embodiment.

FIG. 10 is a block diagram showing an embodiment of computing device 162, which may be in communication with network 160 and various computing systems, such as credit report system 100 and credit bureau/database 108, that are also in communication with the network 160. The computing device 162 may be used to implement systems and methods described herein.

As described above, some embodiments may include portions that are executed by the credit report system 100 and/or by the computing device 162, or are entirely executed by the credit report system 100 or the computing device 162. Thus, discussion herein of any structure (e.g. cpu, memory, etc) of the computing device 162 or operations performed by the computing device 162 or user interface module 110 may be equally applied to the credit report system 100, Furthermore, other computing systems may also perform all or some of the processes discussed with reference to the user interface module 110.

The computing device 162 includes, for example, a personal computer that is IBM, Macintosh, iOS, Android or Linux/Unix compatible or a server or workstation. In one embodiment, the computing device 162 comprises a server, a laptop computer, a smart phone, a personal digital assistant, a kiosk, or an media player, for example. In one embodiment, the exemplary computing device 162 includes one or more central processing unit ("CPU") 905, which may each include a conventional or proprietary microprocessor. The computing device 162 further includes one or more memory 930, such as random access memory ("RAM") for temporary storage of information, one or more read only memory ("ROM") for permanent storage of information, and one or more mass storage device 920, such as a hard drive, diskette, solid state drive, or optical media storage device. Typically, the modules of the computing device 162 may be connected to the computer using a standard based bus system 980. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of computing device 162 may be combined into fewer components and modules or further separated into additional components and modules, and executed in software, hardware, or a combination of hardware and software.

The computing device 162 is generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, or other compatible operating systems. In Macintosh systems, the operating system may be any available operating system, such as MAC OS X. In other embodiments, the computing device 162 may be controlled by a proprietary operating system. Conventional operating systems control and schedule computer processes for execution, perform memory management, provide file system, networking, I/O services, and provide a user interface functionality usable by the user interface module 110, such as a graphical user interface ("GUI"), among other things.

The exemplary computing device 162 may include one or more commonly available input/output (I/O) devices and interfaces 910, such as a keyboard, mouse, touchscreen, and printer. In one embodiment, the I/O devices and interfaces 910 include one or more display devices, such as a monitor or touchscreen 940, that allows the visual presentation of data to a user. More particularly, a display device provides for the presentation of GUIs, application software data, and multimedia presentations, for example. The computing device 162 may also include one or more multimedia devices, such as speakers, video cards, graphics accelerators, and microphones, for example.

In the embodiment of FIG. 10, the I/O devices and interfaces 910 provide a communication interface to various external devices. In the embodiment of FIG. 10, the computing device 162 is electronically coupled to a network 160 (as shown in FIG. 1), which comprises one or more of a LAN, WAN, and/or the Internet, for example, via a wired, wireless (such as 802.11 networks or a cell phone network), or combination of wired and wireless, communication link. The network 160 communicates with various computing devices and/or other electronic devices via wired or wireless communication links.

In some embodiments information may be provided to the computing device 162 over the network 160 from a credit report system 100 and/or a credit bureau or database 108. Similarly, in some embodiments, information may be provided to the credit report system 100 over the network 160 from a credit bureau or database 108. The credit report system 100 and the credit bureau/database 108 may include one or more internal and/or external data sources. The data sources may include internal and external data sources which store, for example, credit bureau data and/or other consumer data. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

In the embodiment of FIG. 10, the computing device 162 includes a user interface module 110 that may be stored in the mass storage device 920 as executable software codes that are executed by the CPU 905. This and other modules in the computing device 162 may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 10, the computing device 162 is configured to the execute the user interface module 110 in order to for example, receive credit report and summary attributes regarding a specific consumer, generate a spin-wheel user interface, access and display category data for a specific consumer based on a spin-wheel section selection, receive touch screen input, rotate the spin-wheel according to the received input, display new credit summary category data for the specific consumer associated with the selected category, and perform other methods as described herein (such as the processes described with respect to FIGS. 2 and 3).

User interface module 902 may generate and render circular rotational visual user interfaces based on upon the received credit information. By interacting with these user interfaces, a user of computing device 162 may view various information about credit data categories and see how their credit data is affecting their credit score. Exemplary embodiments of user interfaces presented by such a section is shown in FIGS. 4-8.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, such as the computing device 162, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Like the computing device 162, credit report system 100 and credit bureau/database 108 may comprise similar computing hardware, software, and functionality as described above for computing device 162.

Other

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the credit report system 100, consumer computing device 162, and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A non-transitory computer-readable medium comprising instructions configured to cause one or more computer processors to perform operations comprising:
   receiving credit score user interface data, wherein the credit score user interface data comprises at least:
      a consumer's credit score based on a credit score algorithm; and
      a consumer's summary credit information associated with respective categories of credit information used in calculation of the consumer's credit score;
   generating a user interface configured for display on a touch sensitive computing device, the user interface including:
      a plurality of sections of a circular visual computer interface, wherein each section of the plurality of sections is associated with a category of credit information and each section of the plurality of sections is a predetermined size according to the associated category's weighting within the credit score algorithm; and a visual section indicator that indicates one of the plurality of sections as selected within the circular visual computer interface;

accessing the credit summary information associated with a selected category of credit information, wherein the selected category comprises credit usage, age of accounts, types of accounts, payment history, or inquiries, and wherein the user interface is configured to depict the circular visual computer interface rotating in response to a dragged touch input on the displayed circular visual computer interface, wherein the rotation causes the visual section indicator to indicate a particular section as selected by the circular visual computer interface; and displaying at least a portion of the consumer's credit summary information for the selected category of credit information associated with a selected section of the circular visual computer interface that is indicated as selected by the visual section indicator.

2. The non-transitory computer-readable medium of claim 1, wherein displaying at least the portion of the consumer's credit summary information for the selected category associated with the selected section of the circular visual computer interface comprises transferring, to a client computing device, an updated user interface.

3. The non-transitory computer-readable medium of claim 1, wherein receiving credit score user interface data comprises receiving credit score user interface data from a web server.

4. The non-transitory computer-readable medium of claim 1, wherein the operations further comprise displaying consumer account information in response to receiving a touch input within the user interface.

5. The non-transitory computer-readable medium of claim 1, wherein the instructions comprise a computer application for a mobile device.

6. The non-transitory computer-readable medium of claim 1 wherein displaying at least the portion of the consumer's credit summary information for the selected category associated with the selected section of the circular visual computer interface comprises displaying a dynamic pie chart relating to information within the selected category.

7. A computerized method comprising:

receiving a credit score for a consumer generated by a credit score algorithm;

receiving credit summary information regarding the consumer, the credit summary information indicating information associated with a plurality of credit categories of a credit report of the consumer, wherein each of the credit categories has a weighting within the credit score algorithm;

storing the consumer's credit score and credit summary information in a computer memory;

rendering, for display, a spin-wheel user interface, the spin-wheel user interface comprising a plurality of spin-wheel user interface sections each associated with a respective credit category of the plurality of credit categories, each spin-wheel user interface section set to a predetermined size according to the associated credit category's weighting within the credit score algorithm, wherein the spin-wheel user interface illustrates relative relationships between the credit categories in calculating consumer credit scores using the credit score algorithm;

receiving a touch input from a user via a touch screen interface selecting a first of the plurality of spin-wheel user interface sections associated with a first credit category of the plurality of credit categories;

accessing a first portion of the credit summary information associated with the first credit category, wherein the first portion of the credit summary information is information associated with credit usage, age of accounts, types of accounts, payment history, or inquiries; and displaying the first portion of the credit summary information associated with the first selected spin-wheel user interface section, said method performed by a computing system that comprises one or more processors.

8. The method of claim 7, wherein displaying the first portion of the credit summary information associated with the first selected spin-wheel user interface section comprises rendering an updated user interface.

9. The method of claim 7, wherein receiving the credit score and credit summary information regarding the consumer comprises receiving credit score user interface data from a web server.

10. The method of claim 7 further comprising displaying consumer account information in response to receiving a second touch input via the touch screen near the first portion of the credit summary information.

11. The method of claim 7 wherein displaying the first portion of the credit summary information associated with the first selected spin-wheel user interface section comprises displaying a dynamic pie chart relating to the first portion of the credit summary information.

12. A computing device comprising:

one or more processors; and a user interface module executable by the one or more processors, configured to at least:

receive credit information specific to a consumer comprising summary credit information associated with a plurality of credit categories;

store the credit information in a data store;

display, on a touch screen display, a visual circular rotational user interface comprising a plurality of visual credit category sections associated with respective credit categories, each visual credit category section set to a predetermined size according to the respective credit category's weighting within a credit score algorithm, wherein the visual circular rotational user interface illustrates relative relationships between the credit categories in calculating consumer credit scores using the credit score algorithm;

display, on the touch screen display, a visual credit category section indicator configured to indicate a visual credit category section as selected;

receive a touch screen input selecting a visual credit category section, and access, in the data store, a first portion of the credit information specific to the consumer, wherein the first portion of the credit information corresponds to data associated with the selected visual credit category section, and wherein the selected visual credit category is associated with credit usage, age of accounts, types of accounts, payment history, or inquiries; and display, on the touch screen display, the first portion of the credit information specific to the consumer.

13. The computing device of claim 12, wherein the computing device is a wireless mobile computing device.

14. The computing device of claim 13, wherein receiving credit information specific to the consumer comprises receiving asynchronous user interface updates from a web server comprising credit information specific to the consumer.

15. The computing device of claim 12, wherein the user interface module is further configured to display consumer account information in response to receiving a second touch screen input near the display of the first portion of credit information specific to the consumer.

16. The computing device of claim 12, wherein the user interface is further configured to display a dynamic pie chart relating to the first portion of the credit information specific to the consumer.

* * * * *